United States Patent
Oh et al.

(10) Patent No.: US 12,397,655 B2
(45) Date of Patent: Aug. 26, 2025

(54) TORQUE CONTROL METHOD FOR DRIVE SYSTEM OF ELECTRIC VEHICLE

(71) Applicants: Hyundai Motor Company, Seoul (KR); Kia Corporation, Seoul (KR)

(72) Inventors: Ji Won Oh, Hwaseong-Si (KR); Ho Wook Lee, Seoul (KR); Jeong Soo Eo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 131 days.

(21) Appl. No.: 18/390,783

(22) Filed: Dec. 20, 2023

(65) Prior Publication Data

US 2025/0018805 A1 Jan. 16, 2025

(30) Foreign Application Priority Data

Jul. 14, 2023 (KR) .................. 10-2023-0091447

(51) Int. Cl.
*B60L 15/20* (2006.01)
*B60K 1/02* (2006.01)
*B60K 17/356* (2006.01)
*B60L 7/26* (2006.01)

(52) U.S. Cl.
CPC ............ *B60L 15/20* (2013.01); *B60K 1/02* (2013.01); *B60K 17/356* (2013.01); *B60L 7/26* (2013.01); *B60L 2250/26* (2013.01)

(58) Field of Classification Search
CPC ...... B60L 15/20; B60L 15/2009; B60L 15/10; B60L 7/26; B60L 7/18; B60L 2250/26; B60L 2240/423; B60L 2240/26; B60K 1/02; B60K 17/356; Y02T 10/72; Y02T 10/64; B60Y 2200/91; B60Y 2306/09

See application file for complete search history.

(56) References Cited

U.S. PATENT DOCUMENTS

| | | | | |
|---|---|---|---|---|
| 2018/0312078 | A1* | 11/2018 | Message | B60L 15/2063 |
| 2020/0070836 | A1* | 3/2020 | Suzuki | B60L 15/20 |
| 2020/0231048 | A1* | 7/2020 | Gauthier | B60L 15/34 |
| 2020/0391598 | A1* | 12/2020 | Lee | H02P 6/08 |

FOREIGN PATENT DOCUMENTS

| | | |
|---|---|---|
| KR | 10-1448746 B | 10/2014 |
| KR | 10-1704243 B | 2/2017 |
| KR | 2022-0096746 A | 7/2022 |
| WO | WO-2013057930 A1 * | 4/2013 ........... B60K 17/356 |

* cited by examiner

*Primary Examiner* — Michael J Zanelli
(74) *Attorney, Agent, or Firm* — MORGAN, LEWIS & BOCKIUS LLP

(57) ABSTRACT

In a torque control method for a drive system of an electric vehicle configured for generating torque by evading a backlash band to prevent occurrence of backlash in the drive system, torque control modes include a contra-directional distribution mode in an acceleration direction in which a front-wheel torque command is determined to be a maximum front-wheel torque threshold value set as a negative (−) torque value in a regenerative direction and a rear-wheel torque command is determined to be a positive (+) torque value in a driving direction and a contra-directional distribution mode in a regenerative direction in which the rear-wheel torque command is determined to be a minimum rear-wheel torque threshold value set as a positive (+) torque value in the driving direction and the front-wheel torque command is determined to be a negative (−) torque value in the regenerative direction thereof.

20 Claims, 7 Drawing Sheets

TORQUE CONTROL METHOD FOR DRIVE SYSTEM OF ELECTRIC VEHICLE

CROSS-REFERENCE TO RELATED APPLICATION

The present application claims priority to Korean Patent Application No. 10-2023-0091447 filed on Jul. 14, 2023, the entire contents of which is incorporated herein for all purposes by this reference.

BACKGROUND OF THE PRESENT DISCLOSURE

Field of the Present Disclosure

The present disclosure relates to a torque control method for a drive system of an electric vehicle. More particularly, it relates to a torque control method capable of generating torque by evading a backlash band of a drive system in an electric vehicle.

Description of Related Art

In general, a drive system of a vehicle needs to generate appropriate torque in response to a torque command determined by a driving input value of a driver (an accelerator pedal input value, a brake pedal input value, etc.) or a request of an advanced driver assistance system (ADAS) or the like.

In the instant case, when a torque change rate is set to be excessively large, there may occur problems such as driveshaft torsion, gear backlash strike, or impulsive drivability deterioration due to rapidly changing torque.

Conversely, when the torque change rate is excessively small, it takes excessive time for the driver or an ADAS controller to generate required torque, and actual behavior of the vehicle differs from intention of the driver, causing frustrating responsiveness or dangerous situations.

Accordingly, there is a trade-off between a degree of reduction in noise, vibration, and harshness (NVH) in the vehicle due to rapid torque change and a degree of securement of acceleration/deceleration responsiveness of the vehicle.

In current mass-produced vehicles, torque slope (torque change rate) limits and filters using various conditions as factors are used to generate optimal torque commands capable of solving such trade-off.

Furthermore, in an electrified vehicle using a motor as a driving source or a portion thereof, active feedback torque compensation control capable of suppressing vibration that has previously occurred due to backlash or the like using the motor may be applied.

However, even when advanced backlash post-correction control is applied, it is difficult to suppress a problem of deterioration in vehicle responsiveness, which inevitably occurs chronically due to hardware characteristics. Moreover, noise, vibration, and harshness (NVH) issues due to backlash frequently occur in an electric vehicle having few vibration damping elements in a drive system thereof.

A related art discloses a method of generating a model speed of a driveshaft using a disturbance observer and reducing vibration using a deviation between the model speed and an actual speed of the driveshaft. The related art also discloses a method of calculating a model speed based on a wheel speed instead of the disturbance observer in determining the model speed.

A related art discloses a method of generating a model speed of a motor using an input torque model and reducing vibration using a deviation between the model speed and an actual speed of the motor.

A related art discloses a method of estimating a speed of a drive system using a torque model and determining a slope of a torque command using a difference between an actual speed and the estimated speed of the drive system.

However, all of the above conventional technologies only suggest a torque compensation method for reducing and suppressing vibration generated in a drive system, and fail to suggest a torque determination method capable of minimizing or preventing occurrence of vibration itself.

Therefore, in relation to backlash of a drive system, there is a demand for a control method capable of generating a torque command by evading a backlash band in which backlash of a drive system may occur, rather than a control method that alleviates problems caused by backlash.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a torque command generation method and a torque control method for a drive system of an electric vehicle configured for generating torque by evading a backlash band to prevent occurrence of backlash in the drive system.

Furthermore, various aspects of the present disclosure are directed to providing a mode-to-mode switching method configured for improving and minimizing a backlash problem while securing driving performance and drivability of a vehicle and a torque command generation method and a torque control method in mode switching situations.

The objects of the present disclosure are not limited to the objects mentioned above, and other objects not mentioned herein may be clearly understood by those skilled in the art to which an exemplary embodiment of the present disclosure pertains (hereinafter referred to as "persons of ordinary skill") from the following description.

Various aspects of the present disclosure are directed to providing a method of controlling torque of a drive system of an electric vehicle, the method including determining, by a controller, a total torque command required for driving of a vehicle, determining, by the controller, a torque control mode corresponding to a current driving state of the vehicle among a plurality of preset torque control modes and the entering of the determined torque control mode, determining, by the controller, a front-wheel torque command and a rear-wheel torque command according to the entered torque control mode from the determined total torque command, and controlling, by the controller, a front-wheel motor and a rear-wheel motor of the vehicle in response to the determined front-wheel torque command and the determined rear-wheel torque command, wherein the plurality of torque control modes includes a contra-directional distribution mode in an acceleration direction in which the front-wheel torque command is determined to be a maximum front-wheel torque threshold value set as a negative (−) torque value in a regenerative direction and the rear-wheel torque command is determined to be a positive (+) torque value in a driving direction and a contra-directional distribution mode in a regenerative direction in which the rear-wheel torque command is determined to be a minimum rear-wheel torque threshold value set as a positive (+) torque value in the driving direction and the front-wheel torque command is determined to be a negative (−) torque value in the regenerative direction thereof.

Other aspects and exemplary embodiments of the present disclosure are discussed infra.

It is understood that the term "vehicle" or "vehicular" or other similar terms as used herein are inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
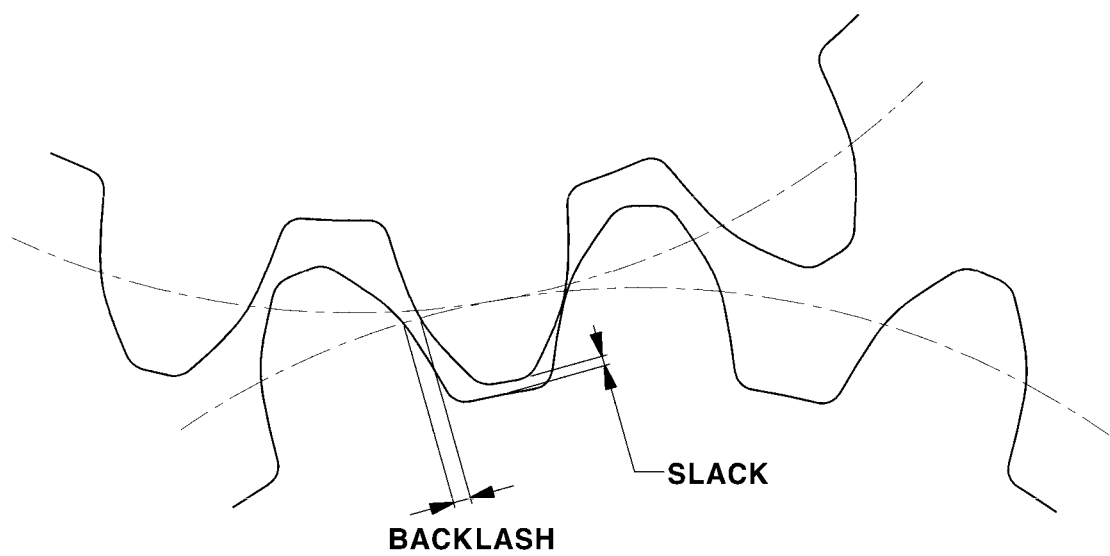
FIG. 1 is a diagram for explaining backlash.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments will now be described more fully with reference to the accompanying drawings, in which only some exemplary embodiments are shown. Predetermined structural and functional details included herein are merely representative for describing exemplary embodiments of the present disclosure. The present disclosure, however, may be embodied in many alternate forms, and should not be construed as being limited only to the exemplary embodiments set forth herein. Accordingly, while exemplary embodiments of the present disclosure are configured for being variously modified and taking alternative forms, various exemplary embodiments thereof are shown by way of example in the drawings and will herein be described in detail. It should be understood, however, that there is no intent to limit the present disclosure to the exemplary embodiments disclosed. On the other hand, various exemplary embodiments are to cover all modifications, equivalents, and alternatives falling within the scope of the present disclosure.

It will be understood that, although the terms "first", "second", etc. may be used herein to describe various elements, these elements should not be limited by these terms. These terms are only used to distinguish one element from another. For example, a first element could be termed a second element, and similarly, a second element could be termed a first element, without departing from the scope of the exemplary embodiments of the present disclosure.

It will be understood that when an element is referred to as being "connected" or "coupled" to another element, it may be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Wherever possible, the same reference numbers will be used throughout the drawings to refer to the same or like parts. The terminology used herein is for describing various exemplary embodiments only and is not intended to be limiting of exemplary embodiments of the present disclosure. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated components, steps, operations, and/or elements, but do not preclude the presence or addition of one or more other components, steps, operations, and/or elements.

Various embodiments of the present disclosure relate to a torque control method for a drive system of an electric vehicle, and more particularly, to a method for generating drive system torque by evading a backlash band so that occurrence of backlash in the drive system is minimized or prevented, rather than a method that alleviates problems caused by backlash in the drive system.

In an exemplary embodiment of the present disclosure, a method of separating an operating torque region of a front-wheel motor and an operating torque region of a rear-wheel motor from each other is used to essentially evade a backlash band in a drive system in generating torque.

In an exemplary embodiment of the present disclosure, a backlash band may be defined as a torque region in which backlash may occur in a drive system of a vehicle. Here, the drive system of the vehicle includes a drive device and drive wheels for driving the vehicle, and further includes drive elements, such as a driveshaft between the drive device and the drive wheels, a reducer, a differential, and an axle.

In an exemplary embodiment of the present disclosure, the aforementioned drive system includes a front-wheel-side drive system between a front-wheel drive device (front-wheel motor) and front wheels and a rear-wheel-side drive system between a rear-wheel drive device (rear-wheel motor) and rear wheels.

In the following description, "torque" encompasses both torque input to a drive system by a drive device and transmitted and applied to drive wheels and torque transmitted and applied to the drive device from the drive wheels through the drive system.

Furthermore, in the following description, "torque" encompasses both driving torque (acceleration torque) for acceleration of the vehicle and braking torque (deceleration torque) for deceleration of the vehicle. Here, "braking torque" encompasses regenerative torque by a motor and friction braking torque by a friction braking device.

In the present specification, torque may be driving torque accelerating the vehicle (acceleration situation) or braking torque decelerating the vehicle (deceleration situation) depending on the driving situation of the vehicle, unless the torque is specified as driving torque or braking torque. However, motor torque decelerating the vehicle is regenerative torque.

In the present specification, the driving torque and a driving torque command as torque accelerating the vehicle are defined as torque including a positive (+) value or a positive direction thereof. On the other hand, the braking torque and a braking torque command as torque decelerating the vehicle are defined as torque including a negative (−) value or a negative direction thereof.

In the following description, a front-wheel torque command and a rear-wheel torque command are motor torque commands (a front-wheel motor torque command and a rear-wheel motor torque command), and when the torque value of the command indicates a negative (−) value, the command refers to a regenerative torque command for a corresponding motor.

As described above, when the vehicle is driving, torque in the positive (+) direction or torque in the negative (−) direction is applied to the drive system depending on whether the vehicle is accelerating or decelerating, and the direction of the torque input to the drive system and transmitted through the drive system may change depending on the driving situation of the vehicle.

The present disclosure has been generated based on the principle that a problem caused by backlash in a drive system of a vehicle mainly occurs only in a torque region close to 0, and the torque region close to 0 may be referred to as a backlash band where a backlash problem may occur.

In an exemplary embodiment of the present disclosure, the backlash band may be set to a torque range bordering a lower limit threshold value, which is a negative (−) value, and an upper limit threshold value, which is a positive (+) value. That is, the backlash band may be set to a torque range including 0, and a backlash state may occur when input torque applied from the motor, which is the drive device, to the drive system or applied from the drive wheels to the drive system enters the set backlash band.

Backlash is a tolerance that exists between engaged teeth of two gears, as shown in FIG. 1. Between two engaged gears, vibration or noise may occur as gear teeth strike each other due to backlash, and in the worst case, backlash may cause damage to the gears.

When torque is continuously applied in one direction, one of the two engaged gears continues to transmit force to the other in the same direction thereof. Thus, the teeth of the two engaged gears are maintained in a state of being aligned and engaged with each other in one direction thereof. In the instant case, a problem due to a backlash tolerance does not occur.

However, when the direction of the torque is changed, the direction of force transmission is changed, and thus the teeth of the gears are aligned in the reverse direction after experiencing a backlash tolerance. In the instant case, while force is continuously transmitted in the same direction through the teeth after alignment of the teeth in the reverse direction, engagement between the gears is not released again, and thus a problem due to backlash does not occur.

However, in the case in which the direction of force transmission is changed, a problem due to backlash occurs when engagement between the teeth of the two gears is released and then the teeth of the two gears are again engaged with each other while passing through an engagement tolerance.

Therefore, the core of a method of preventing occurrence of a backlash problem is to eliminate or minimize a situation in which gear engagement is released, which may be achieved by eliminating or minimizing change in the direction of a torque command for the drive device such as the motor.

To eliminate or minimize change in the direction of a torque command, the front-wheel and rear-wheel drive devices, i.e., the front-wheel motor and the rear-wheel motor, need to share functions. To the present end, a method of separating a torque operating region for the front-wheel motor and a torque operating region for the rear-wheel motor from each other may be considered.

However, application of the present control method may limit maximum acceleration performance. To overcome the present limitation, switching of a torque control mode is necessary. The present disclosure is directed to providing an effective mode switching method.

Figure 2:
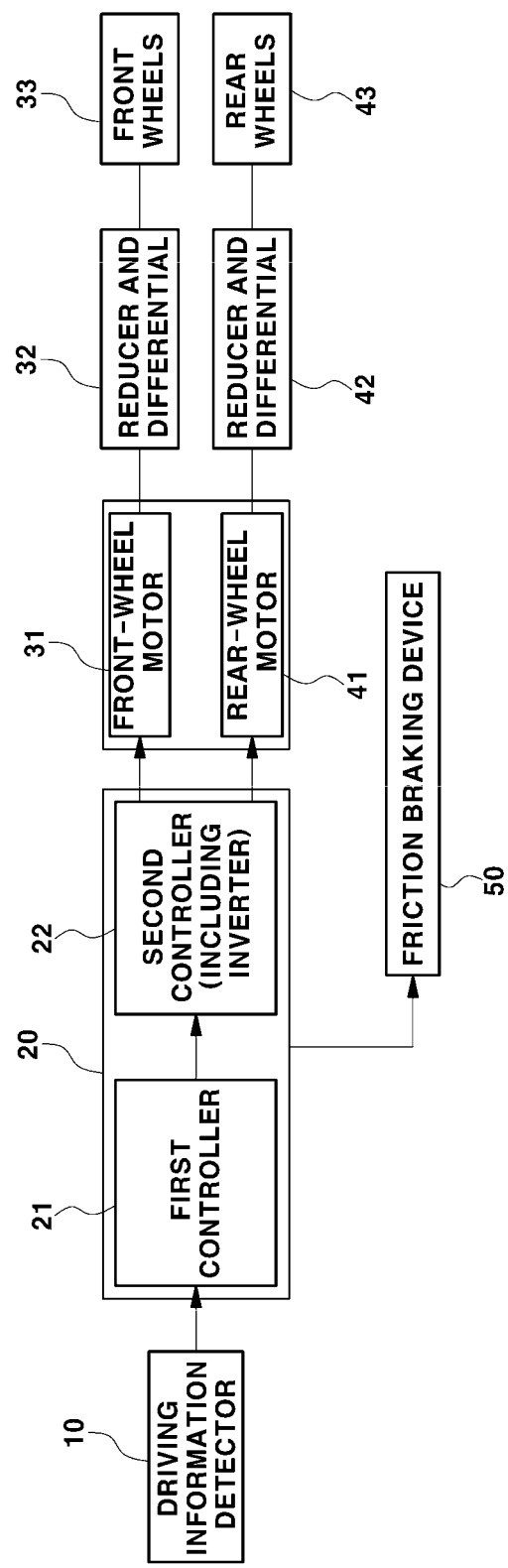
FIG. 2 is a block diagram showing the configuration of a device for performing a drive system torque control process according to various exemplary embodiments of the present disclosure.

FIG. 2 is a block diagram showing the configuration of a device for performing a drive system torque control process according to various exemplary embodiments of the present disclosure.

The present disclosure may be applied to a vehicle provided with a plurality of drive devices for driving the vehicle. The present disclosure may be applied to a vehicle in which front wheels 33 and rear wheels 43 are driven by independent drive devices, respectively.

In detail, the present disclosure may be applied to a vehicle provided with a front-wheel drive device for applying torque to the front wheels 33 and a rear-wheel drive device for applying torque to the rear wheels 43. Here, both the front wheels 33 and the rear wheels 43 are drive wheels connected to the drive devices to enable transmission of power.

Furthermore, the present disclosure may be applied to a vehicle in which both the front-wheel drive device and the rear-wheel drive device are motors. In the following description, a motor 31 as the front-wheel drive device will be referred to as a "front-wheel motor", and a motor 41 as the rear-wheel drive device will be referred to as a "rear-wheel motor".

Referring to FIG. 2, the front-wheel motor 31 and the rear-wheel motor 41 are shown as drive devices of an electric vehicle. The front-wheel motor 31 and the rear-wheel motor 41 are connected to the front wheels 33 and the rear wheels 43 provided as drive wheels via drive system elements, such as reducers, differentials 32 and 42, and axles, respectively, to enable transmission of power.

Accordingly, torque output from the front-wheel motor 31 and the rear-wheel motor 41 may be transmitted to the front wheels 33 and the rear wheels 43 through the drive system elements, such as the reducers, the differentials 32 and 42, and the axles.

Furthermore, although not shown in FIG. 2, a battery is connected to the front-wheel motor 31 and the rear-wheel motor 41 via an inverter to be chargeable and dischargeable. The inverter may include a front-wheel inverter for driving and controlling the front-wheel motor 31 and a rear-wheel inverter for driving and controlling the rear-wheel motor 41.

In the electric vehicle, operation (driving and regeneration) of the front-wheel motor 31 and the rear-wheel motor 41 is controlled in response to torque commands generated by a controller 20. The controller 20 is configured to determine required torque according to a vehicle driving state, and generates a final torque command (total torque command) based on the required torque.

Furthermore, the controller 20 is configured to determine torque commands for the respective motor, i.e., a front-wheel torque command and a rear-wheel torque command, from the final torque command, and is configured to control operation of the front-wheel motor 31 and the rear-wheel motor 41 through the inverters based on the determined torque commands. When the front-wheel torque command and the rear-wheel torque command have positive (+) values, the torque commands are defined as driving torque commands, and when the front-wheel torque command and the rear-wheel torque command have negative (−) values, the torque commands are defined as regenerative torque commands.

The final torque command is a total torque command for generation of required torque necessary for driving of the vehicle through the motors (or the motors and the friction braking device), and is a pre-distribution torque command before distribution of torque to the front and rear wheels. In the following description, "pre-distribution torque command", "sum torque command", and "total torque command" are used interchangeably.

In an exemplary embodiment of the present disclosure, the controller 20 may include a first controller 21, which is configured to determine required torque necessary for driving of the vehicle based on a driving input value of the driver or receives required torque from another controller such as an ADAS controller to generate and output a front-wheel torque command and a rear-wheel torque command as torque commands for the respective motors (axles) based on the required torque, and a second controller 22, which is configured to control operation of the front-wheel motor 31 and the rear-wheel motor 41 in response to the final torque command input from the first controller 21.

The first controller 21 may be a vehicle control unit (VCU) for use in a general vehicle, which is configured to determine and generate a total torque command necessary for driving of the vehicle. Since a method and process for determining a torque command in a vehicle are well known in the art to which an exemplary embodiment of the present disclosure pertains, a detailed description thereof will be omitted.

The first controller 21 may be configured to determine the front-wheel torque command and the rear-wheel torque command from the total torque command through a process of distributing torque to the front and rear wheels. Here, both the front-wheel torque command and the rear-wheel torque command as torque commands for the respective axles are motor torque commands. The front-wheel torque command is a torque command for the front-wheel motor 31, and the rear-wheel torque command is a torque command for the rear-wheel motor 41.

Accordingly, when the front-wheel torque command and the rear-wheel torque command are output from the first controller 21, the second controller 22 receives the front-wheel torque command and the rear-wheel torque command, and is configured to control operation of the front-wheel motor 31 and the rear-wheel motor 41 through the front-wheel inverter and the rear-wheel inverter.

Accordingly, torque output from the front-wheel motor 31 is applied to the front wheels 33 through the reducer and the differential 32 of the front-wheel-side drive system, and torque output from the rear-wheel motor 41 is applied to the rear wheels 43 through the reducer and the differential 42 of the rear-wheel-side drive system.

The second controller 22 may be a general motor control unit (MCU) that is configured to control operation of a driving motor through an inverter in response to a torque command output from a vehicle control unit (VCU) in an electric vehicle.

Although the control subject has been described above as including the first controller 21 and the second controller 22, the torque control process according to an exemplary embodiment of the present disclosure may be performed by one integrated control element instead of a plurality of controllers.

A plurality of controllers and one integrated control element may be collectively referred to as a controller, and the torque control process according to an exemplary embodiment of the present disclosure to be described below may be performed by the present controller.

In an exemplary embodiment of the present disclosure, vehicle driving information, such as a driving input value input to the controller 20 by the driver, is information indicating a vehicle driving state, and may include sensor detection information detected by a driving information detector 10 and input to the controller 20 through a vehicle network.

The driving information detector 10 may include an accelerator position sensor (APS) configured to detect an accelerator pedal input value (APS value, %) of the driver, a brake pedal position sensor (BPS) configured to detect a brake pedal input value (BPS value, %) of the driver, a sensor configured to detect a drive system speed, and a sensor configured to detect a vehicle speed.

Here, the drive system speed may be a rotation speed of the front-wheel motor 31 and the rear-wheel motor 41, which are driving motors, or a rotation speed (wheel speed) of the drive wheels 33 and 43. In the instant case, the sensor configured to detect the drive system speed may be a sensor configured to detect a rotation speed of each of the motors 31 and 41. The present sensor may be a general resolver configured to detect the position of a rotor of a motor. Alternatively, the sensor configured to detect the drive system speed may be a general wheel speed sensor configured to detect the rotation speed (wheel speed) of the drive wheels 33 and 43.

Furthermore, the sensor configured to detect the vehicle speed may also be a wheel speed sensor. Since a process of obtaining vehicle speed information from a signal from a wheel speed sensor is well known in the art to which an exemplary embodiment of the present disclosure pertains, a detailed description thereof will be omitted.

Vehicle driving information for determination and generation of the required torque and torque command by the controller 20 is detected by the driving information detector 10. The accelerator pedal input value (APS value, %) of the driver, the brake pedal input value (BPS value, %) of the driver, the rotation speed of the motors 31 and 41, the rotation speed of the drive wheels 33 and 43, the vehicle speed, etc. may be selectively used as the vehicle driving information.

In the vehicle driving information, the accelerator pedal input value (APS value) and the brake pedal input value (BPS value), which are driving input values of the driver, may be referred to as driving input information of the driver, and the rotation speed of the motors 31 and 41, the rotation speed of the drive wheels 33 and 43, and the vehicle speed detected by the driving information detector 10 may be referred to as vehicle state information.

Furthermore, the vehicle driving information may include information independently determined by the controller 20 in a broad sense, and furthermore, may include information (e.g., required torque information) input to the controller 20 from another controller (e.g., the ADAS controller) in the vehicle through the vehicle network.

In FIG. 2, reference numeral 50 denotes a friction braking device of the vehicle, which may be a general hydraulic braking device. The friction braking device may be a front-wheel friction braking device configured to apply friction braking torque to the front wheels 33 or a rear-wheel friction braking device configured to apply friction braking torque to the rear wheels 43.

Meanwhile, various aspects of the present disclosure are directed to providing a method configured for generating a torque command by evading the backlash band in which backlash in the drive system may occur. Here, evasion of the backlash band means maximally preventing a situation in which the torque command invades the backlash band.

This may be achieved by a method in which front-wheel torque and a front-wheel torque command maintain only negative (−) torque values and rear-wheel torque and a rear-wheel torque command maintain only positive (+) torque values since the backlash issue includes occurring when the direction of torque is changed as mentioned above.

When the present control strategy is applied, the rear-wheel-side drive system continuously aligns gears in a positive (+) torque transmission direction in order not to enter the backlash band, which may be achieved by continuously generating at least a small amount of positive (+) directional torque.

In the instant case, the small amount of positive (+) directional torque for continuously aligning the gears in the positive (+) torque transmission direction may be defined as a minimum rear-wheel torque threshold value (which is a positive value), and a value of the rear-wheel torque command (which is a positive value) may be determined in a region equal to or greater than the preset minimum rear-wheel torque threshold value during backlash band evasion control.

Similarly, the front-wheel-side drive system continuously aligns gears in a negative (−) torque transmission direction in order not to enter the backlash band, which may be achieved by continuously generating at least a small amount of negative (−) directional torque.

In the instant case, the small amount of negative (−) directional torque for continuously aligning the gears in the negative (−) torque transmission direction may be defined as a maximum front-wheel torque threshold value (which is a negative value), and a value of the front-wheel torque command (which is a negative value) may be determined in a region equal to or less than the preset maximum front-wheel torque threshold value during backlash band evasion control.

In an exemplary embodiment of the present disclosure, the minimum rear-wheel torque threshold value may be set in the controller 20 as a torque value outside the backlash band, which is a torque region in which backlash may occur in the rear-wheel-side drive system. That is, the minimum rear-wheel torque threshold value may be set to a value greater than an upper limit threshold value of the backlash band of the rear-wheel-side drive system.

Similarly, the maximum front-wheel torque threshold value may be set in the controller 20 as a torque value outside the backlash band, which is a torque region in which backlash may occur in the front-wheel-side drive system. In the instant case, the maximum front-wheel torque threshold value may be set in the controller 20 to a value smaller than a lower limit threshold value of the backlash band of the front-wheel-side drive system.

However, the present method may entail a problem that, since only a motor for one of a front wheel axle and a rear wheel axle is used for acceleration and for regenerative braking (deceleration), maximally generated output may be insufficient compared to when motors for both axles are used for all purposes.

That is, since only one of the front-wheel motor 31 and the rear-wheel motor 41 is used, maximally generated output may be insufficient compared to when both the front-wheel motor 31 and the rear-wheel motor 41 are used for acceleration or for regenerative braking. This may make it difficult to exhibit maximum acceleration performance or maximum regenerative braking performance.

However, considering a principle that, load movement is concentrated on the rear wheel side during acceleration, and thus torque of the rear wheel axle plays a main role, and conversely, load movement is concentrated on the front wheel side during deceleration, and thus regenerative torque of the front wheel axle plays a main role, the backlash band evasion strategy provided in an exemplary embodiment of the present disclosure does not cause significant deterioration in performance.

Nevertheless, it is certain that the maximum performance achievable when only a motor for one axle is used does not reach the maximum performance achievable when motors for both axles are used together. Therefore, the following countermeasures may be considered to overcome these limitations.

First, a contra-directional distribution mode may be set in the controller 20. The contra-directional distribution mode may be selectively performed by the controller 20. The contra-directional distribution mode may be referred to as a responsiveness priority mode in which acceleration/deceleration responsiveness of the vehicle is preferentially considered, and may also be referred to as a backlash band evasion mode in which backlash band evasion control is performed. In the contra-directional distribution mode, contra-directional distribution control is performed so that torque commands in opposite directions are distributed to the front wheels and the rear wheels and torques in opposite directions are applied to the front wheels and the rear wheels.

Furthermore, a co-directional distribution mode, in which occurrence of maximum output is possible unlike the contra-directional distribution mode, may be set in the controller 20. The co-directional distribution mode may be a conventional torque control mode which is applied to a general vehicle. In the co-directional distribution mode, torque commands in the same direction are distributed to the front wheels and the rear wheels and torques in the same direction are applied to the front wheels and the rear wheels.

In the present way, in an exemplary embodiment of the present disclosure, distribution of torques to the front wheels and the rear wheels may be one of co-directional distribution and contra-directional distribution. Co-directional distribution distributes and applies torques in the same direction to the front wheels and the rear wheels, and contra-directional distribution distributes and applies torques in opposite directions to the front wheels and the rear wheels.

That is, during the co-directional distribution, the front-wheel motor and the rear-wheel motor are controlled to generate torques in the same direction (positive (+) torques or negative (−) torques). Since the front-wheel motor and the rear-wheel motor generate torques in the same direction, the front-wheel torque and the rear-wheel torque are summed, whereby maximum torque may be generated.

However, during the co-directional distribution, when the required torque passes through 0, that is, when the direction and sign ("+" or "−") of the required torque change, the torque command passes through the backlash band, which results in delay in the acceleration/deceleration responsiveness of the vehicle due to control (torque slope limitation) characteristics caused when the torque command passes through the backlash band.

On the other hand, during the contra-directional distribution, the front-wheel motor and the rear-wheel motor are controlled to generate torques in different directions. For example, the front-wheel motor is controlled to generate negative (−) torque, and the rear-wheel motor is controlled to generate positive (+) torque. Accordingly, the rear-wheel motor is configured to perform generating driving torque for acceleration of the vehicle, and the front-wheel motor is configured to perform generating regenerative torque for deceleration (regenerative braking) of the vehicle.

That is, the front-wheel torque command for control of operation of the front-wheel motor 31 is always determined to be a negative (−) torque value, and the rear-wheel torque command for control of operation of the rear-wheel motor 41 is always determined to be a positive (+) torque value. Therefore, during the contra-directional distribution, the torque command does not need to pass through the backlash band, and there is no need to limit the slope of the torque command in the backlash band. As a result, the acceleration/deceleration responsiveness of the vehicle may be improved.

In an exemplary embodiment of the present disclosure, if the required torque (sum required torque) is positive (+) directional torque, it is necessary to generate driving torque for acceleration of the vehicle, and thus contra-directional distribution control in the acceleration direction is performed. In the instant case, the torque command for the front-wheel motor (front-wheel torque command) is determined to be a negative (−) directional torque command.

In the instant case, the magnitude of the absolute value of the torque command is determined to be a minimum value by which the gear teeth in the front-wheel-side drive system are maintained in an aligned state so that backlash does not occur. Here, the minimum value means a maximum front-wheel torque threshold value, and the maximum front-wheel torque threshold value may be a value that varies in real time depending on the state of the drive system.

Furthermore, in the instant case, the torque command for the rear-wheel motor (rear-wheel torque command) is determined to be a positive (+) directional torque command. The rear-wheel torque command may be determined to be a value obtained by subtracting the front-wheel torque command from the total torque command (sum torque command or pre-distribution torque command).

Similarly, if the required torque (sum required torque) is negative (−) directional torque, it is necessary to generate regenerative torque for deceleration of the vehicle, and thus contra-directional distribution control in the regenerative direction is performed. In the instant case, the torque command for the rear-wheel motor (rear-wheel torque command) is determined to be a positive (+) directional torque command.

In the instant case, the magnitude of the absolute value of the torque command is determined to be a minimum value by which the gear teeth in the rear-wheel-side drive system are maintained in an aligned state so that backlash does not occur. Here, the minimum value means a minimum rear-wheel torque threshold value, and the minimum rear-wheel torque threshold value may be a value that varies in real time depending on the state of the drive system.

Furthermore, in the instant case, the torque command for the front-wheel motor (front-wheel torque command) is determined to be a negative (−) directional torque command. The front-wheel torque command may be determined to be a value obtained by subtracting the rear-wheel torque command from the total torque command (sum torque command or pre-distribution torque command).

Here, the state of the drive system may include input torque applied to the drive system by the motor driving the vehicle. Furthermore, the input torque may be a provided one of the total torque command, an estimated motor torque value estimated by a motor controller, a motor torque detection value detected by a torque sensor, a value obtained by applying a filter to the total torque command, a value obtained by applying a filter to the estimated motor torque value, and a value obtained by applying a filter to the motor torque detection value.

Alternatively, the input torque may be a front-wheel torque command and a rear-wheel torque command determined by a general front/rear wheel torque distribution process of distributing the total torque command according to a front/rear wheel distribution ratio. In the instant case, the maximum front-wheel torque threshold value may be changed to a value corresponding to the distributed front-wheel torque command, and the minimum rear-wheel torque threshold value may be changed to a value corresponding to the distributed rear-wheel torque command.

According to the present contra-directional distribution, it is not possible to generate maximum driving force or maximum regenerative braking force by the motor, but relatively immediate acceleration/deceleration responsiveness may be realized in all situations.

In an exemplary embodiment of the present disclosure, the torque control mode of the vehicle may include the following four modes, which are classified according to the driving state of the vehicle in consideration of the above characteristics.

Contra-directional distribution in acceleration direction
Contra-directional distribution in regenerative direction
Co-directional distribution in acceleration direction
Co-directional distribution in regenerative direction The present disclosure is directed to providing mode-to-mode switching (transition) conditions and switching methods configured for securing driving performance and drivability of an electric vehicle, which is an application target vehicle, in a state in which the above four torque control modes are set.

The controller 20 is configured to perform control for mode determination and mode-to-mode switching based on vehicle driving information. Here, the vehicle driving information includes a pedal input value, which is driving input information of the driver, and the pedal input value includes an accelerator pedal input value and a brake pedal input value. The accelerator pedal input value and the brake pedal input value may be obtained from signals from an accelerator pedal sensor (APS) and a brake pedal sensor (BPS) of the driving information detector 10.

Figure 3:
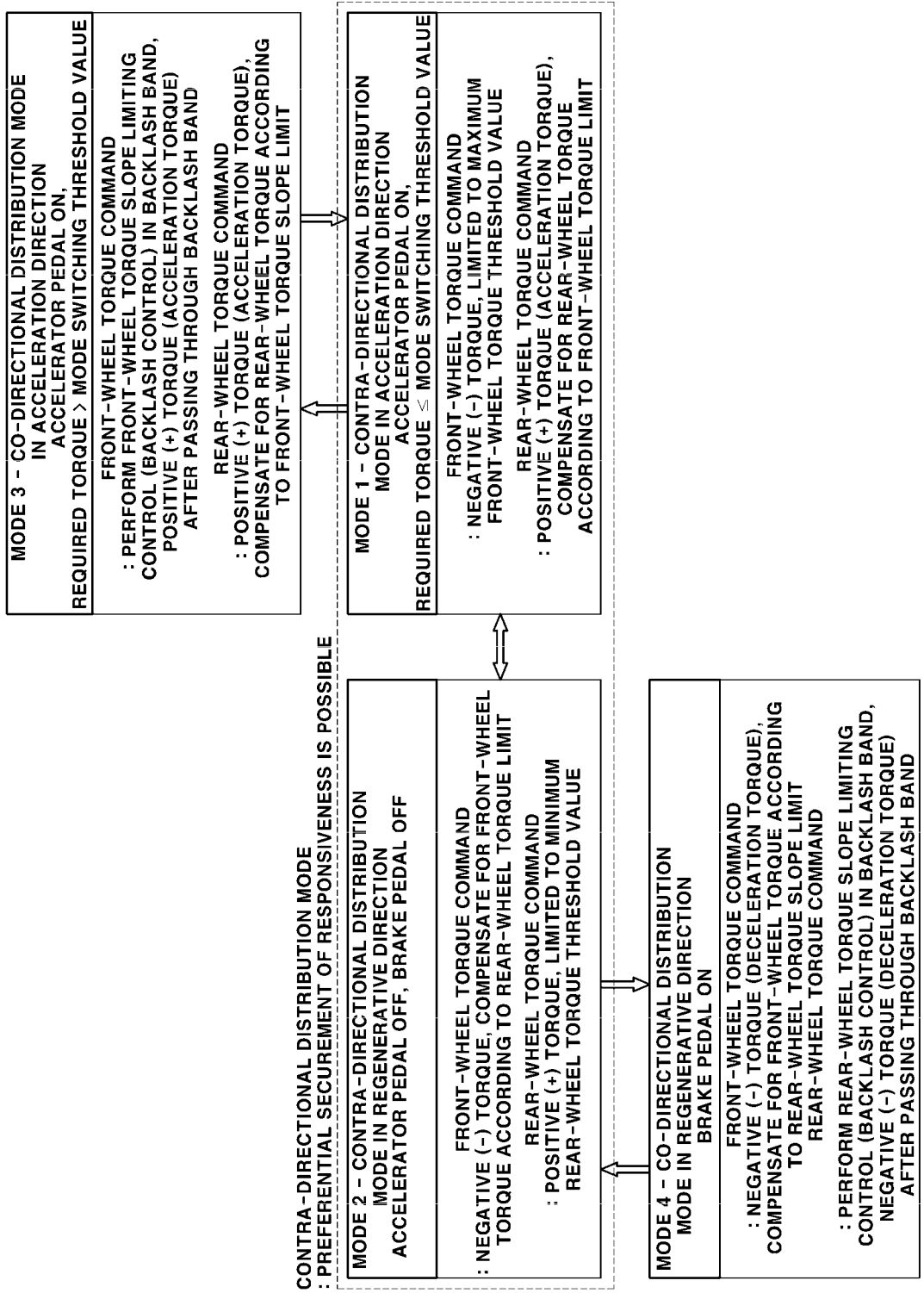
FIG. 3 is a diagram showing types of torque control modes and mode-to-mode switching conditions and methods according to an exemplary embodiment of the present disclosure.

FIG. 3 is a diagram showing types of torque control modes and mode-to-mode switching conditions and methods according to an exemplary embodiment of the present disclosure.

In the following description, "accelerator pedal on" and "brake pedal on" are defined as a state in which the driver depresses a corresponding pedal to apply a pedal input. The present state is used interchangeably with "pedal depressing force applied state", "accelerator pedal applied state", or "brake pedal applied state".

Furthermore, "accelerator pedal off" and "brake pedal off" are defined as a pedal non-operated state in which the driver does not depress a corresponding pedal, i.e., a state in which there is no pedal input. The present state is used interchangeably with "pedal depressing force released state", "accelerator pedal released state", or "brake pedal released state".

In an exemplary embodiment of the present disclosure, the controller 20 may recognize the on/off state of the accelerator pedal and the on/off state of the brake pedal in real time from signals from the accelerator pedal sensor and the brake pedal sensor of the driving information detector 10.

In an exemplary embodiment of the present disclosure, the contra-directional distribution mode is selected in the controller 20 in a state in which the driver releases both the accelerator pedal and the brake pedal and a state in which required torque (command) according to an accelerator pedal input value after application of the accelerator pedal by the driver is equal to or less than a preset mode switching threshold value.

Here, the required torque as pre-distribution required torque may be referred to as sum torque obtained by summing the front-wheel torque and the rear-wheel torque. In the present specification, the required torque (command) necessary for driving of the vehicle and the total torque command are used interchangeably.

When both the accelerator pedal and the brake pedal are in an off state, the contra-directional distribution mode in the regenerative direction ("mode 2" in FIG. 3) is selected by the controller 20. In the accelerator pedal on state in which the driver applies the accelerator pedal and in a state in which the required torque is equal to or less than the mode switching threshold value, the contra-directional distribution mode in the acceleration direction ("mode 1" in FIG. 3) is selected by the controller 20.

Furthermore, when the driver applies the accelerator pedal in a state in which the contra-directional distribution mode in the regenerative direction is selected, the contra-directional distribution mode in the regenerative direction is switched to the contra-directional distribution mode in the acceleration direction thereof. Conversely, when the driver releases the accelerator pedal to turn off the accelerator pedal in a state in which the contra-directional distribution mode in the acceleration direction is selected, the contra-directional distribution mode in the acceleration direction is switched to the contra-directional distribution mode in the regenerative direction thereof.

Furthermore, after switching from the contra-directional distribution mode in the regenerative direction to the contra-directional distribution mode in the acceleration direction, the contra-directional distribution mode in the acceleration direction is maintained until the required torque corresponding to the accelerator pedal input value (APS value) reaches the mode switching threshold value, and thus zero-crossing of the front-wheel torque and the rear-wheel torque is not required.

Here, the mode switching threshold value may be set to a positive (+) torque value. Furthermore, the mode switching threshold value may be a preset value within a required torque value range obtainable only by torque of the rear-wheel motor.

Furthermore, a mode switching threshold value for switching from the contra-directional distribution mode ("mode 1" in FIG. 3) to the co-directional distribution mode ("mode 3" in FIG. 3) and a mode switching threshold value for switching and re-entry from the co-directional distribution mode to the contra-directional distribution mode may be set to different values and used.

Furthermore, when the required torque for driving of the vehicle, i.e., the required torque corresponding to the accelerator pedal input value, exceeds the mode switching threshold value or when the driver applies the brake pedal to turn on the brake pedal, the contra-directional distribution mode is terminated and is switched to the co-directional distribution mode by the controller 20.

In an exemplary embodiment of the present disclosure, when the required torque for driving of the vehicle, i.e., the required torque corresponding to the accelerator pedal input value, exceeds the mode switching threshold value in the contra-directional distribution mode in the acceleration direction, the contra-directional distribution mode in the acceleration direction is switched to the co-directional distribution mode in the acceleration direction ("mode 3" in FIG. 3) by the controller 20.

Furthermore, when the driver applies the brake pedal to turn on the brake pedal in the contra-directional distribution mode in the regenerative direction, the contra-directional distribution mode in the regenerative direction is switched to the co-directional distribution mode in the regenerative direction ("mode 4" in FIG. 3) by the controller 20.

Furthermore, when the required torque decreases to the mode switching threshold value or less in the co-directional distribution mode in the acceleration direction or when the driver releases the brake pedal to turn off the brake pedal in the co-directional distribution mode in the regenerative direction, the co-directional distribution mode is terminated and is switched back to the contra-directional distribution mode by the controller 20.

As described above, at the time of switching from the co-directional distribution mode to the contra-directional distribution mode or switching from the contra-directional distribution mode to the co-directional distribution mode, zero-crossing is caused, making it difficult to immediately perform mode switching to cope with a backlash impact occurrence region. However, the present time delay may provide smooth drivability in conjunction with a time interval from release of the brake pedal by the driver to depressing of the accelerator pedal by the driver.

Additionally, in the mode switching strategy according to an exemplary embodiment of the present disclosure, at the time of switching between the co-directional distribution mode and the contra-directional distribution mode, zero-crossing occurs in the torque of only one of the front-wheel motor and the rear-wheel motor. Therefore, it is possible to compensate for torque response delay occurring due to the zero-crossing to a large extent using the other motor.

Figure 4:
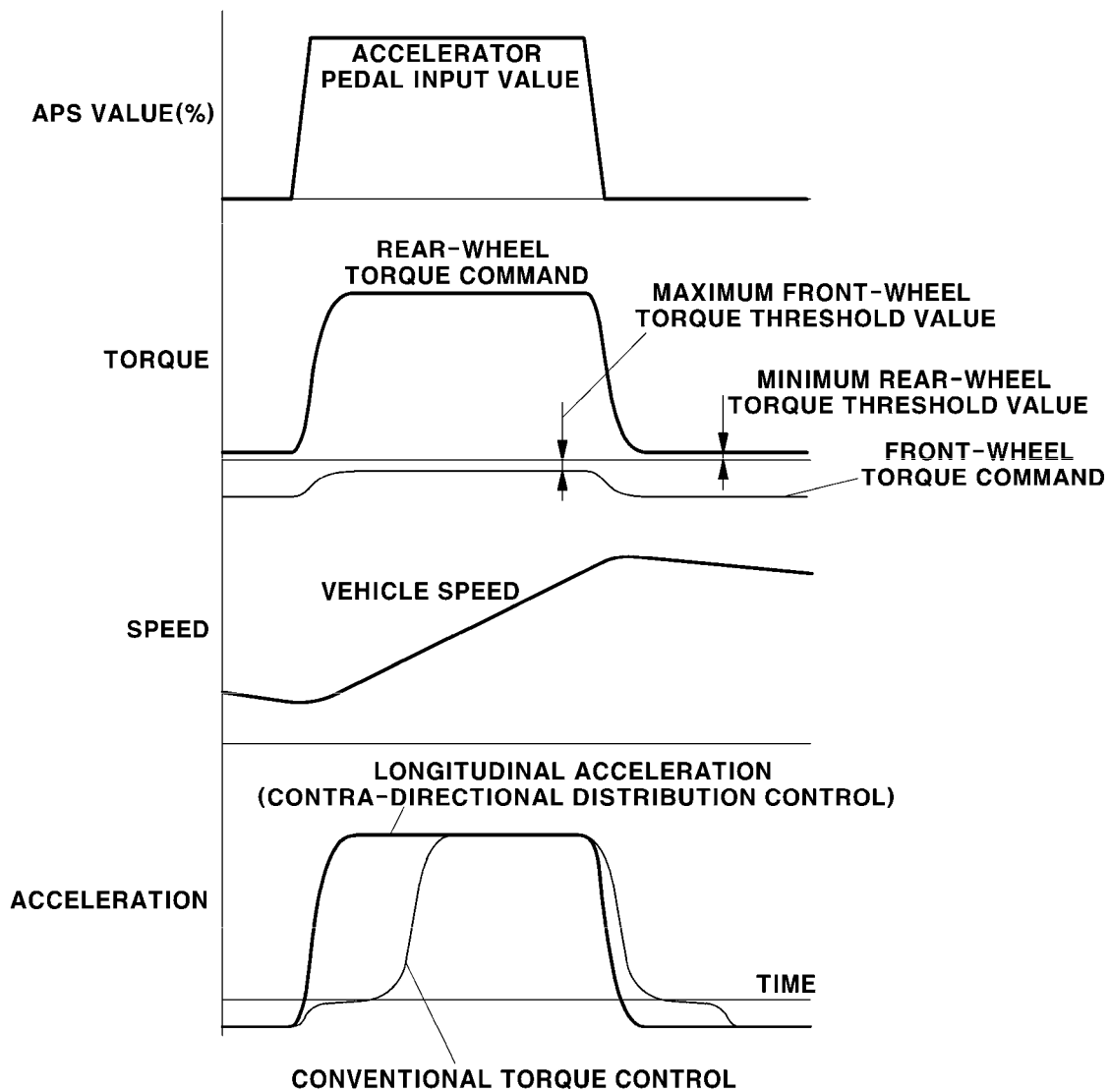
FIG. 4 is a diagram illustrating a control state at the time of switching from a contra-directional distribution mode in a regenerative direction to a contra-directional distribution mode in an acceleration direction according to an exemplary embodiment of the present disclosure.

FIG. 4 is a diagram illustrating a control state at the time of switching from the contra-directional distribution mode in the regenerative direction to the contra-directional distribution mode in the acceleration direction according to an exemplary embodiment of the present disclosure. A state in which torque is controlled by the controller 20 in the contra-directional distribution mode will be described in brief with reference to FIG. 4 in comparison with the co-directional distribution mode. Although not shown in the example of FIG. 4, the brake pedal is maintained in an off state.

As shown, zero-crossing of the torque command is unnecessary at the time of switching between the contra-directional distribution modes. Referring to the example of FIG. 4, while the contra-directional distribution mode in the regenerative direction is performed by the controller 20 in a state in which both the accelerator pedal and the brake pedal are released, if the driver applies the accelerator pedal, the contra-directional distribution mode in the regenerative direction is switched to the contra-directional distribution mode in the acceleration direction thereof.

In FIG. 4, the contra-directional distribution mode in the acceleration direction is a mode which is performed by the controller 20 when the required torque corresponding to the accelerator pedal input value (APS value) does not exceed the preset mode switching threshold value.

In an exemplary embodiment of the present disclosure, the contra-directional distribution mode in the regenerative direction or the contra-directional distribution mode in the acceleration direction may be selected by the controller 20 depending on the vehicle driving information including the pedal input value. During the contra-directional distribution mode in the regenerative direction, the controller 20 is configured to perform backlash band evasion control so that the rear-wheel torque command (which is a positive value) is limited to the minimum rear-wheel torque threshold value (which is a positive value) or greater. During the contra-directional distribution mode in the acceleration direction, the controller 20 is configured to perform backlash band evasion control so that the front-wheel torque command (which is a positive value) is limited to the maximum front-wheel torque threshold value (which is a positive value) or less.

In the contra-directional distribution mode, the front-wheel motor 31 and the rear-wheel motor 41 do not generate driving force in the same direction or regenerative braking force in the same direction thereof. The front-wheel motor 31 implements only regenerative braking, and the rear-wheel motor 41 implements only driving of the vehicle. Therefore, it is impossible to implement driving and regenerative braking of the vehicle with the maximum output.

However, unlike the co-directional distribution mode, in a state in which the contra-directional distribution mode is entered, zero-crossing in which the front-wheel torque command or the rear-wheel torque command passes through 0 torque in the backlash band is unnecessary, thus making it possible to secure responsiveness.

On the other hand, during the co-directional distribution mode, as will be described later, the front-wheel motor 31 and the rear-wheel motor 41 implement, in cooperation with each other, driving or regenerative braking of the vehicle, whereby driving or regenerative braking of the vehicle may be implemented with the maximum output. However, in the co-directional distribution mode, zero-crossing of the torque inevitably occurs, and thus responsiveness delay may occur.

However, there is no difference between the contra-directional distribution mode and the co-directional distribution mode in that the front-wheel torque command and the rear-wheel torque command are determined so that a sum of the front-wheel torque command and the rear-wheel torque command becomes a value that follows the total torque command.

As described above, during the contra-directional distribution mode according to an exemplary embodiment of the present disclosure, both in a deceleration situation of the vehicle (mode 2, contra-directional distribution mode in regenerative direction) and in an acceleration situation of the vehicle (mode 1, contra-directional distribution mode in acceleration direction), the directions of the torques output from the front-wheel motor 31 and the rear-wheel motor 41 and transmitted through the drive systems are controlled to be maintained constant without being changed.

In the instant case, the front-wheel torque command is always determined to be a negative (−) torque value, and the rear-wheel torque command is always determined to be a positive (+) torque value. Accordingly, while driving of the vehicle, the front-wheel motor 31 continuously applies negative (−) torque to the drive system, and the rear-wheel motor 41 continuously applies positive (+) torque to the drive system.

Furthermore, during the contra-directional distribution mode, the front-wheel torque command and the rear-wheel torque command are determined by the controller 20 so that a torque value obtained by summing the front-wheel torque command and the rear-wheel torque command becomes the total torque command value.

In more detail, in the example of FIG. 4, the contra-directional distribution mode in the regenerative direction is selected by the controller 20 in the accelerator pedal off state and the brake pedal off state. During the contra-directional distribution mode in the regenerative direction, the required torque and the total torque command have negative (−) values as regenerative torque. The present state corresponds to a deceleration state of the vehicle.

However, as may be seen in FIG. 4, during the contra-directional distribution mode in the regenerative direction, the rear-wheel torque command is determined to be the minimum rear-wheel torque threshold value set as a positive (+) torque value in the driving direction thereof. In the instant case, the front-wheel torque command is determined to be a value obtained by subtracting the minimum rear-wheel torque threshold value (which is positive torque) from the total torque command (which is negative torque).

The front-wheel torque command determined in the instant way includes a negative (−) torque value. Accordingly, the rear-wheel motor 41 outputs positive (+) torque and applies the same to the drive system, and the front-wheel motor 31 outputs negative (−) torque and applies the same to the drive system.

Thereafter, when the driver depresses the accelerator pedal, the contra-directional distribution mode in the acceleration direction is entered. The contra-directional distribution mode in the acceleration direction is maintained in a state in which the required torque (total torque command) is equal to or less than the mode switching threshold value.

However, although not shown in FIG. 4, when the required torque (total torque command) exceeds the mode switching threshold value in the contra-directional distribution mode in the acceleration direction, the co-directional distribution mode in the acceleration direction is entered.

When the driver applies the accelerator pedal and thus the contra-directional distribution mode in the acceleration direction is entered, the front-wheel torque command is determined to be the maximum front-wheel torque threshold value set as a negative (−) torque value in the regenerative direction thereof. In the instant case, the rear-wheel torque command is determined to be a positive (+) torque value obtained by subtracting the maximum front-wheel torque threshold value (which is negative torque) from the total torque command (which is positive torque) corresponding to the accelerator pedal input value. That is, the rear-wheel torque command becomes a positive (+) torque value obtained by adding the absolute value of the maximum front-wheel torque threshold value to the total torque command.

During the contra-directional distribution mode in the acceleration direction, the front-wheel torque command is limited to the maximum front-wheel torque threshold value. Therefore, to satisfy the total torque command, torque compensation of adding positive (+) torque equivalent to the limited amount of front-wheel torque to the rear-wheel torque command is performed.

Similarly, during the above-described contra-directional distribution mode in the regenerative direction, the rear-wheel torque command is limited to the minimum rear-wheel torque threshold value. Therefore, to satisfy the total torque command, torque compensation of adding negative (−) torque equivalent to the limited amount of rear-wheel torque to the front-wheel torque command (negative value) is performed.

Thereafter, when the driver releases the accelerator pedal again, the rear-wheel torque command is again determined to be the minimum rear-wheel torque threshold value, and the front-wheel torque command is determined to be a negative (−) torque value obtained by subtracting the rear-wheel torque command (minimum rear-wheel torque threshold value), which is a positive (+) value, from the total torque command (which is negative torque), which is regenerative torque.

When the front-wheel torque command and the rear-wheel torque command are determined as described above, the controller 20 is configured to control operation of the front-wheel motor 31 and the rear-wheel motor 41 in response to the front-wheel torque command and the rear-wheel torque command.

Figure 5:
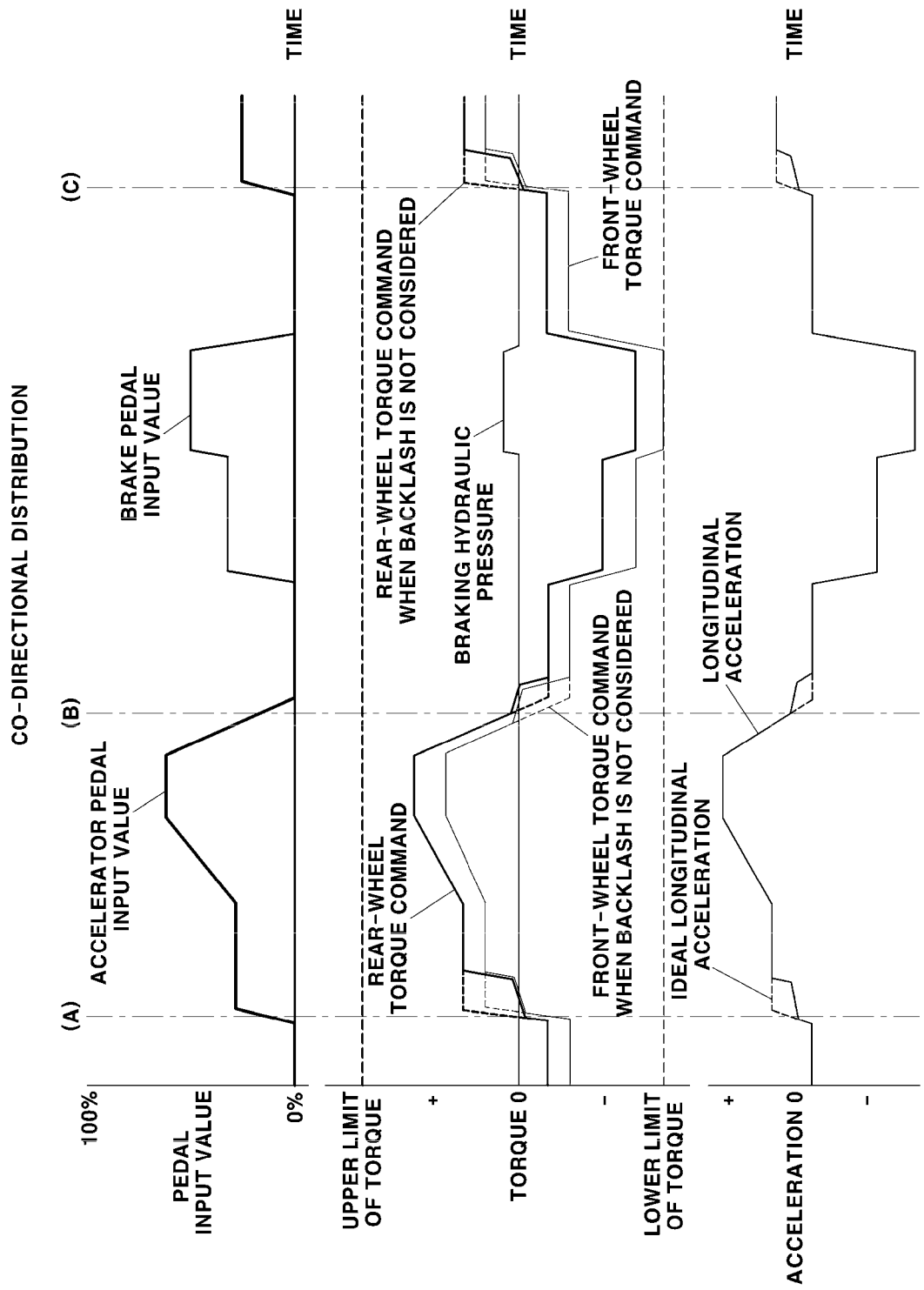
FIG. 5 is a diagram for explaining a comparative example in which torque control is performed only through a co-directional distribution mode, unlike the present disclosure.

FIG. 5 is a diagram for explaining a comparative example in which torque control is performed only through a co-directional distribution mode without a contra-directional distribution mode, unlike the present disclosure. The comparative example is not different from a conventional torque control method. In the example of FIG. 5, the mode switching process provided in an exemplary embodiment of the present disclosure is not performed.

If the co-directional distribution control is consistently performed, the front-wheel torque command and the rear-wheel torque command are determined so that a sum thereof follows the total torque command. Furthermore, the front-wheel torque command and the rear-wheel torque command are always determined to be torque values including the same sign in the same direction thereof.

The accelerator pedal is applied at the time point (A). Before the accelerator pedal is applied, the required torque (sum torque as pre-distribution torque) is a negative (−) value. The required torque increases to a positive (+) value after the accelerator pedal is applied.

In the instant case, both the front-wheel torque command and the rear-wheel torque command pass through the backlash band while undergoing zero-crossing. Furthermore, because both the front-wheel torque command and the rear-wheel torque command increase from negative (−) values to positive (+) values, the slopes (change rates) of the torque commands are limited to around torque 0 to prevent occurrence of backlash impact. Accordingly, torque follow-up responsiveness deteriorates at the time point (A), and the present problem also occurs at the time point (C). As may be seen in the acceleration graph of FIG. 5, at the time points (A) and (C), the longitudinal acceleration of the vehicle differs from an ideal longitudinal acceleration, and there is a problem of delay of acceleration/deceleration responsiveness of the vehicle.

While the front-wheel torque command and the rear-wheel torque command pass through the backlash band, torque slope control is performed to limit the slopes (change rates) of the front-wheel torque command and the rear-wheel torque command, so that the torque commands are not sharply increased.

For the present backlash control, a maximum allowable change rate in the backlash band with respect to the front-wheel torque command and the rear-wheel torque command may be set in the controller to a small value that does not cause backlash impact.

Accordingly, while the front-wheel torque command and the rear-wheel torque command increase and pass through the backlash band, the front-wheel torque command and the rear-wheel torque command are determined by the controller to be values that gently change along the maximum allowable change rate set to the above small value.

Furthermore, after passing through the backlash band, the front-wheel torque command and the rear-wheel torque command are distributed by a general front/rear wheel torque distribution process of distributing the total torque command according to a front/rear wheel distribution ratio. At the instant time, the front-wheel torque command and the rear-wheel torque command are determined to sizes capable of satisfying driving torque required for acceleration.

At the time point (B), the accelerator pedal input value decreases, and thus the required torque decreases from a positive (+) value to a negative (−) value. At the instant time, both the front-wheel torque command and the rear-wheel torque command pass through the backlash band while undergoing zero-crossing, and decrease from positive (+) values to negative (−) values. Therefore, the slopes of the torque commands are limited to around torque 0 to prevent occurrence of backlash impact. Accordingly, torque follow-up responsiveness deteriorates.

The deterioration in acceleration/deceleration responsiveness at the time point (B) can also be seen from the acceleration value of the vehicle shown in the lower end portion of FIG. 5. Compared to an ideal acceleration graph (dotted line) in which there is no need to consider backlash, it may be seen from an actual acceleration graph (solid line) that responsiveness deteriorates around 0.

Referring to FIG. 5, it may be seen that co-directional distribution of regenerative torques is performed when the brake pedal is applied. Both the front-wheel torque command and the rear-wheel torque command have negative (−) values as regenerative torques.

When the brake pedal is applied, the total torque command indicating a negative (−) value includes a front-wheel torque command including a negative (−) value and a rear-wheel torque command including a negative (−) value to satisfy the total braking torque corresponding to the brake pedal input value.

At the present time, as shown in the example of FIG. 5, when the front-wheel torque command is smaller than a lower limit value of the torque (regenerative torque) which may be generated by the front-wheel motor, the front-wheel torque command is limited to the lower limit value of the torque, and braking hydraulic pressure is generated so that friction braking torque compensates for insufficient braking torque.

At the present time, the controller is configured to generate a friction braking torque command for a friction braking device to control operation of the friction braking device, and accordingly, friction braking torque is applied to the vehicle wheels by the friction braking device.

The friction braking torque command may be determined by the controller to be a torque value obtained by subtracting a sum of the front-wheel torque command and the rear-wheel torque command from the total torque command (total braking torque) corresponding to the brake pedal input value.

Figure 6:
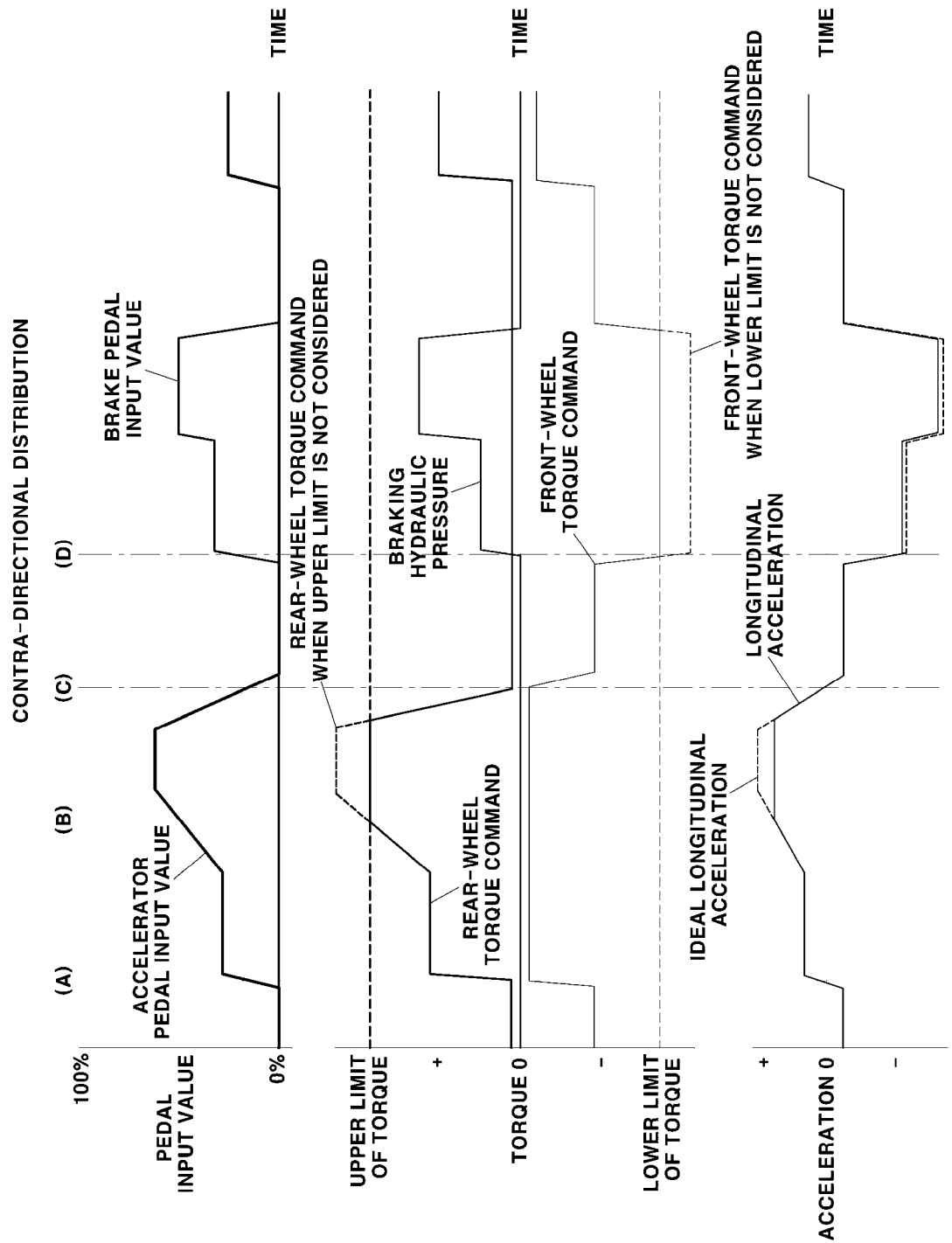
FIG. 6 is a diagram for explaining a comparative example in which torque control is performed only through a contra-directional distribution mode, unlike the present disclosure.

Next, FIG. 6 is a diagram for explaining another comparative example in which torque control is performed only through a contra-directional distribution mode without a co-directional distribution mode, unlike the present disclosure. In the example of FIG. 6, only the contra-directional distribution mode is performed, but the mode switching process provided in an exemplary embodiment of the present disclosure is not performed.

If the contra-directional distribution control is consistently performed, the front-wheel torque command and the rear-wheel torque command are determined so that a sum thereof follows the total torque command. Furthermore, the front-wheel torque command and the rear-wheel torque command are always determined to be torque values including opposite signs in opposite directions.

However, depending on whether the total torque command (required torque) is a positive (+) value or a negative (−) value, a determination as to whether torque control is performed in the acceleration direction or the regenerative direction is made. In the case of the acceleration direction, the front-wheel torque command is maintained at the maximum front-wheel torque threshold value, which is a negative (−) value (negative offset torque), and the rear-wheel torque command is determined to be an acceleration torque (driving torque) command for following the total torque command. In the instant case, the rear-wheel torque command may be determined to be a value obtained by subtracting the maximum front-wheel torque threshold value from the total torque command.

Conversely, in the case of the regenerative direction, the rear-wheel torque command is maintained at the minimum rear-wheel torque threshold value, which is a positive (+) value (positive offset torque), and the front-wheel torque command is determined to be a deceleration torque (regenerative torque) command for following the total torque command. In the instant case, the front-wheel torque command may be determined to be a value obtained by subtracting the minimum rear-wheel torque threshold value from the total torque command.

The accelerator pedal is applied at the time point (A) of FIG. 6. Before the accelerator pedal is applied, the required torque (sum torque as pre-distribution torque) is a negative (−) value. The required torque increases to a positive (+) value after the accelerator pedal is applied.

In the instant case, neither the front-wheel torque command nor the rear-wheel torque command need undergo zero-crossing. The front-wheel torque command increases to the maximum front-wheel torque threshold value, which is a negative (−) value, and the rear-wheel torque command increases to a value obtained by subtracting the maximum front-wheel torque threshold value, which is the front-wheel torque command, from the total torque command.

That is, the rear-wheel torque command is determined to be a value obtained by adding the absolute value of the maximum front-wheel torque threshold value to the total torque command. This includes the meaning of torque compensation in which the front-wheel torque command is limited to the maximum front-wheel torque threshold value and positive (+) torque equivalent to the limited amount of front-wheel torque is added to the rear-wheel torque command.

In the present way, during the contra-directional distribution, zero-crossing of the torque does not occur at the time point (A), and therefore, it is possible to obtain desired acceleration responsiveness without a concern about occurrence of backlash impact.

As the driver further applies the accelerator pedal after the time point (A), the required torque increases (total torque command increases), and the rear-wheel torque command also increases to satisfy the required torque corresponding to the accelerator pedal input value (APS value), and reaches an upper limit value of the torque which may be output by the rear-wheel motor, i.e., the upper limit of the torque illustrated in FIG. 6, at the time point (B).

Due to the upper limit of the torque of the rear-wheel motor, there occurs a situation in which it is impossible to follow the increasing required torque only with the torque of the rear-wheel motor after the time point (B). However, in the comparative example of FIG. 6, only the contra-directional distribution is performed, and therefore, the front-wheel torque command is limited to the maximum front-wheel torque threshold value, which is a negative (−) torque value, and thus is not determined to be a positive (+) value.

As a result, since the torque of the front-wheel motor is regenerative torque, the same may not be used for acceleration of the vehicle. Even when the accelerator pedal is further applied, it is not possible to obtain additional acceleration of the vehicle. It may be seen in the acceleration graph illustrated in the lower end portion of FIG. 6 that the acceleration of the vehicle does not reach desired acceleration ("ideal longitudinal acceleration") due to the upper limit of the torque of the rear-wheel motor and the contra-directional distribution principle of the rear-wheel torque.

Furthermore, the accelerator pedal input value continuously decreases before and after the time point (C). That is, the required torque is a positive (+) value before "accelerator pedal off", but is changed to a negative (−) value after "accelerator pedal off".

In the instant case, neither the front-wheel torque command nor the rear-wheel torque command need undergo zero-crossing. The rear-wheel torque command decreases to the minimum rear-wheel torque threshold value, which is a positive (+) value, and the front-wheel torque command decreases to a value obtained by subtracting the minimum rear-wheel torque threshold value, which is the rear-wheel torque command, from the total torque command. This includes the meaning of torque compensation in which the rear-wheel torque command is limited to the minimum rear-wheel torque threshold value and negative (−) torque equivalent to the limited amount of rear-wheel torque is added to the front-wheel torque command.

In the present way, during the contra-directional distribution, zero-crossing of the torque does not occur at the time point (C), and therefore, it is possible to obtain desired acceleration responsiveness without a concern about occurrence of backlash impact.

The driver applies the brake pedal before and after the time point (D). The situation after the brake pedal is applied is a situation in which braking needs to be performed with braking torque greater than regenerative braking torque required for coasting.

However, it is impossible to follow the required total braking torque due to the lower limit of the torque of the front-wheel motor, i.e., the limit of the regenerative braking torque which may be generated by the front-wheel motor. Furthermore, because the rear-wheel motor is not capable of generating regenerative braking toque due to the contra-directional distribution principle, it is impossible to perform additional regenerative braking.

Therefore, a significant amount of friction braking intervention (greater than in an exemplary embodiment of FIG. 7 to be described later) is required to satisfy the required total braking torque. However, this may be disadvantageous in terms of regenerative efficiency. Furthermore, because the accuracy of friction braking force generation and friction braking control is low compared to regenerative braking, it may be difficult to accurately follow the desired vehicle acceleration (deceleration) due to an error of friction braking force.

Figure 7:
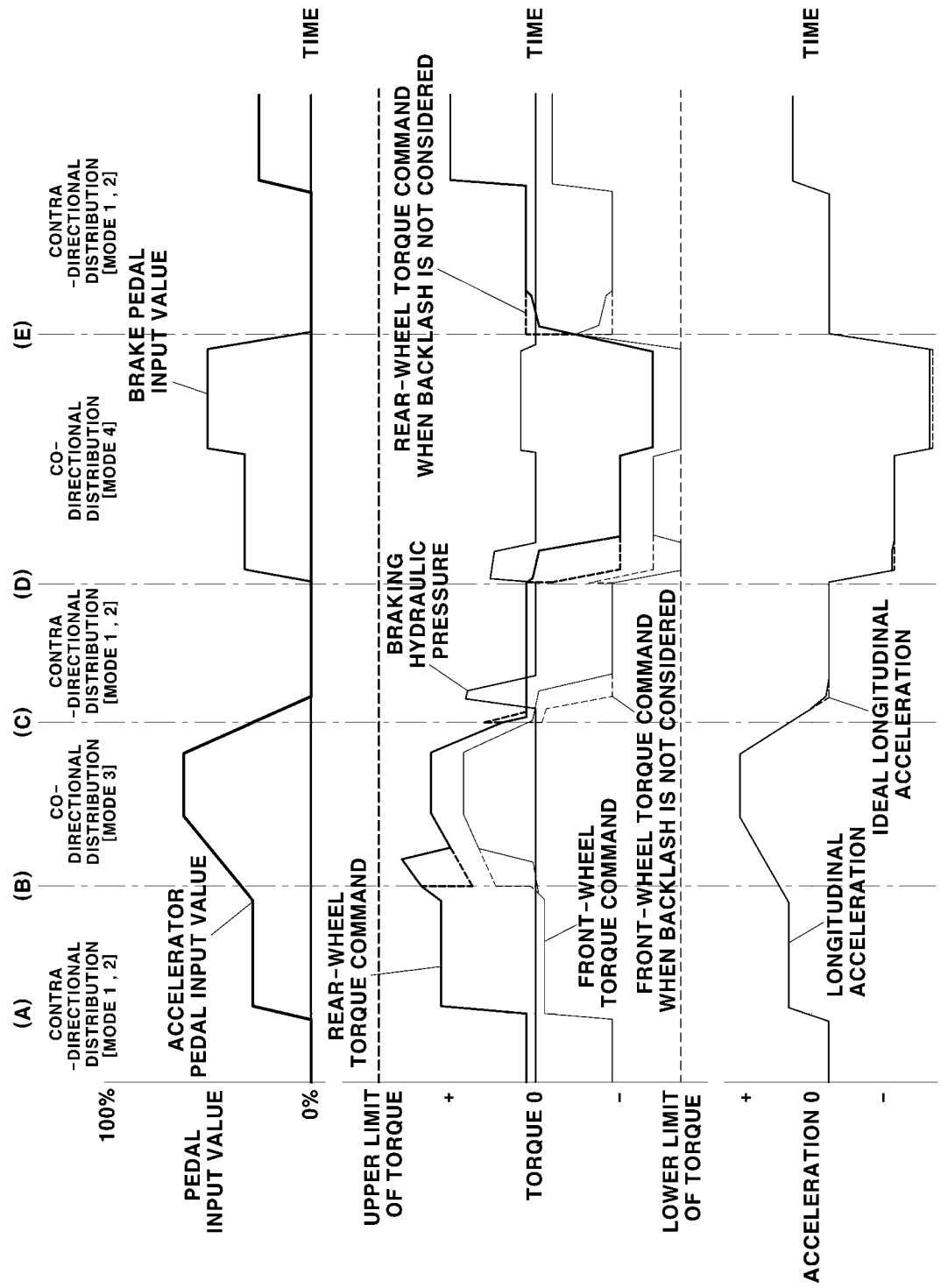
FIG. 7 is a diagram illustrating a torque control state according to various exemplary embodiments of the present disclosure.

Next, FIG. 7 is a diagram illustrating a torque control state according to various exemplary embodiments of the present disclosure. Hereinafter, the torque control method according to the exemplary embodiment of the present disclosure will be described in more detail with reference to FIGS. 3 and 7.

The torque control method according to the exemplary embodiment of the present disclosure is performed by the controller 20, and includes a step in which a total torque command required for driving of the vehicle is determined, a step in which a torque control mode corresponding to the current driving state of the vehicle is determined among a plurality of preset torque control modes and the determined torque control mode is entered, a step in which a front-wheel torque command and a rear-wheel torque command according to the entered torque control mode are determined from the determined total torque command, and a step in which the front-wheel motor and the rear-wheel motor are controlled in response to the determined front-wheel torque command and the determined rear-wheel torque command.

Here, the plurality of torque control modes may include a contra-directional distribution mode in the acceleration direction in which the front-wheel torque command is determined to be a maximum front-wheel torque threshold value set as a negative (−) torque value in the regenerative direction and the rear-wheel torque command is determined to be a positive (+) torque value in the driving direction and a contra-directional distribution mode in the regenerative direction in which the rear-wheel torque command is determined to be a minimum rear-wheel torque threshold value set as a positive (+) torque value and the front-wheel torque command is determined to be a negative (−) torque value.

Furthermore, the plurality of torque control modes may further include a co-directional distribution mode in the acceleration direction in which both the front-wheel torque command and the rear-wheel torque command are determined to be positive (+) torque values.

Furthermore, the plurality of torque control modes may further include a co-directional distribution mode in the regenerative direction in which both the front-wheel torque command and the rear-wheel torque command are determined to be negative (−) torque values.

Referring to FIG. 7, in an exemplary embodiment of the present disclosure, the contra-directional distribution mode or the co-directional distribution mode is not consistently used, but the contra-directional distribution mode and the co-directional distribution mode are used together. Furthermore, in an exemplary embodiment of the present disclosure, selection and switching between the contra-directional distribution mode and the co-directional distribution mode are performed by the controller 20 according to a situation. Therefore, as shown in FIG. 3, the front-wheel torque command and the rear-wheel torque command may have opposite signs or the same sign depending on situations.

Referring to FIG. 7, the driver applies the accelerator pedal at the time point (A) ("accelerator pedal on"). Before the accelerator pedal is applied, the required torque (total torque command) is a negative (−) value. The required torque increases to a positive (+) value after the accelerator pedal is applied ("required torque≤mode switching threshold value").

Accordingly, according to the above-described mode switching method, the torque control mode of the vehicle is switched from the contra-directional distribution mode in the regenerative direction ("mode 2" in FIG. 3) to the contra-directional distribution mode in the acceleration direction ("mode 1" in FIG. 3) at the time point (A) at which the driver applies the accelerator pedal.

Because the present mode switching is performed between the contra-directional distribution modes, the contra-directional distribution method is continuously maintained, and accordingly, neither the front-wheel torque command nor the rear-wheel torque command need undergo zero-crossing. As a result, since there is no zero-crossing of the front-wheel torque command and the rear-wheel torque command, it is possible to obtain desired acceleration responsiveness of the vehicle without a concern about occurrence of backlash impact.

Furthermore, acceleration torque for acceleration of the vehicle is required from the time point (A). However, the front-wheel torque command including a negative (−) torque value in the contra-directional distribution mode in the regenerative direction is increased to the maximum front-wheel torque threshold value, which is not a positive (+) torque value but a negative (−) torque value, when the contra-directional distribution mode in the regenerative direction is switched to the contra-directional distribution mode in the acceleration direction after application of the accelerator pedal.

During the contra-directional distribution mode in the regenerative direction before application of the accelerator pedal, the rear-wheel torque command is maintained at the minimum rear-wheel torque threshold value set as a positive (+) torque value. When the contra-directional distribution mode in the acceleration direction is entered after application of the accelerator pedal, the rear-wheel torque command is increased for desired acceleration of the vehicle.

In the present way, the contra-directional distribution mode performed before application of the accelerator pedal is maintained even after application of the accelerator pedal. Therefore, the front-wheel torque command is determined to be negative (−) torque, and the rear-wheel torque command is determined to be positive (+) torque, whereby the front-wheel torque command and the rear-wheel torque command have torque values including opposite signs in opposite directions.

Furthermore, in the contra-directional distribution modes of modes 1 and 2, the front-wheel torque command is limited to a torque value equal to or less than the maximum front-wheel torque threshold value, which is a negative (−) value, and the rear-wheel torque command is limited to a torque value equal to or greater than the minimum rear-wheel torque threshold value, which is a positive (+) value.

Accordingly, the front-wheel torque command and the rear-wheel torque command may not invade the backlash bands in which backlash may occur in the respective drive systems, and may be determined to be values outside the backlash bands. As a result, target backlash band evasion control may be implemented and achieved.

However, in the contra-directional distribution mode in the regenerative direction (mode 2) before the time point (A), the rear-wheel torque command is determined to be the minimum rear-wheel torque threshold value, which is a positive (+) value, and thus the front-wheel torque needs to be compensated due to rear-wheel torque limiting.

Therefore, torque compensation of adding torque equivalent to the limited amount of rear-wheel torque to the front-wheel torque command is required. To the present end, a torque value obtained by subtracting the minimum rear-wheel torque threshold value from the total torque command is determined to be the front-wheel torque command, and the front-wheel torque command and the rear-wheel torque command are determined so that a sum thereof is always the value of the total torque command.

Furthermore, in the contra-directional distribution mode in the acceleration direction (mode 1) after the time point (A), the front-wheel torque command is determined to be the maximum front-wheel torque threshold value, which is a negative (−) value, and thus the rear-wheel torque needs to be compensated due to front-wheel torque limiting.

Therefore, torque compensation of adding torque equivalent to the limited amount of front-wheel torque to the rear-wheel torque command is required. To the present end, a torque value obtained by subtracting the maximum front-wheel torque threshold value from the total torque command is determined to be the rear-wheel torque command, and the front-wheel torque command and the rear-wheel torque command are determined so that a sum thereof is always the value of the total torque command.

Meanwhile, as the driver further applies the accelerator pedal at the time point (B) ("accelerator pedal on" state), the required torque (total torque command) according to the accelerator pedal input value increases to exceed the preset mode switching threshold value ("required torque>mode switching threshold value").

Accordingly, according to the above-described mode switching method, the torque control mode of the vehicle is switched from mode 1, which is the contra-directional distribution mode in the acceleration direction, to mode 3, which is the co-directional distribution mode in the acceleration direction, by the controller 20.

At the present time, only the front-wheel torque command passes through the backlash band while undergoing zero-crossing, and the rear-wheel torque command is continuously maintained at a positive (+) torque value. While the front-wheel torque command passes through the backlash band, the controller 20 is configured to perform the above-described torque slope limiting control (backlash control) on the front-wheel torque command.

That is, while the front-wheel torque command passes through the backlash band, backlash control is performed to limit the slope (change rate) of the front-wheel torque command, so that the front-wheel torque command is not sharply increased. For the present backlash control, a maximum allowable change rate in the backlash band with respect to the front-wheel torque command is set in the controller 20 to a small value that does not cause backlash impact.

Accordingly, while the front-wheel torque command increases and passes through the backlash band, the front-wheel torque command is determined by the controller 20 to be a value that gently changes along the maximum allowable change rate set to the above small value.

In the present way, when the slope limiting is applied to the front-wheel torque command, a vehicle acceleration responsiveness delay (insufficient acceleration torque) phenomenon may occur. To prevent occurrence of the acceleration responsiveness delay phenomenon, rear-wheel torque compensation is implemented using the rear-wheel motor 41, the torque of which has not reached the upper limit of the torque. The controller 20 implements torque compensation for the rear-wheel torque command by the limited amount of torque while limiting the slope of the front-wheel torque command.

At the present time, the controller 20 is configured to determine a value obtained by subtracting the front-wheel torque command, the slope of which is limited, from the total torque command corresponding to the accelerator pedal input value to be the rear-wheel torque command. Accordingly, a sum of the front-wheel torque command and the rear-wheel torque command may always be a value of the total torque command. As a result, although zero-crossing of the front-wheel torque command occurs, the acceleration responsiveness of the vehicle is not deteriorated because the rear-wheel torque is compensated.

If additional application of the accelerator pedal is input more sharply, or when the torque margin to the upper limit of the torque of the rear-wheel motor 41 is smaller, the rear-wheel torque is compensated only in a region less than or equal to the upper limit of the torque of the rear-wheel motor 41.

To the present end, the controller 20 may be configured to determine a minimum value among a value obtained by subtracting the front-wheel torque command from the total torque command and the upper limit value of the torque of the rear-wheel motor 41 to be the rear-wheel torque command.

Thereafter, while the co-directional distribution in the acceleration direction is performed after the front-wheel torque command completely passes through the backlash band, the front-wheel torque command and the rear-wheel torque command are determined through a general front/rear wheel torque distribution process of distributing the total torque command according to a front/rear wheel distribution ratio, and a sum of the front-wheel torque command and the rear-wheel torque command is made to follow the total torque command.

At the time point (C), the accelerator pedal input value decreases ("accelerator pedal on" state), and thus the required torque (total torque command) corresponding to the accelerator pedal input value becomes equal to or less than the preset mode switching threshold value ("required torque≤ mode switching threshold value").

Therefore, according to the above-described mode switching method, the torque control mode of the vehicle is switched from mode 3, which is the co-directional distribution mode in the acceleration direction, to mode 1, which is the contra-directional distribution mode in the acceleration direction thereof.

Subsequently, when the accelerator pedal is released (when the accelerator pedal input value becomes 0), the torque control mode of the vehicle is switched from mode 1, which is the contra-directional distribution mode in the acceleration direction, to mode 2, which is the contra-directional distribution mode in the regenerative direction thereof. The example of FIG. 7 is a case in which the accelerator pedal input value and the required torque corresponding thereto continuously decrease, and thus the torque control mode of the vehicle is switched from the contra-directional distribution mode in the acceleration direction (mode 1) to the contra-directional distribution mode in the regenerative direction (mode 2) before the front-wheel torque command passes through the backlash band.

As described above, while the accelerator pedal input value decreases, only the front-wheel torque command needs to pass through the backlash band while undergoing zero-crossing. The controller 20 is configured to perform torque slope limiting control (backlash control) on the front-wheel torque command. That is, while the front-wheel torque command passes through the backlash band, backlash control is performed to limit the slope (change rate) of the front-wheel torque command, so that the front-wheel torque command is not sharply decreased.

For the present backlash control, a maximum allowable change rate in the backlash band with respect to the front-wheel torque command is set in the controller 20 to a small value that does not cause backlash impact. Accordingly, while the front-wheel torque command decreases and passes through the backlash band, the front-wheel torque command is determined by the controller 20 to be a value that gently changes along the maximum allowable change rate set to the above small value.

In the present way, while the backlash control is performed to limit the slope of the front-wheel torque command, a vehicle deceleration responsiveness delay phenomenon (deceleration delay phenomenon due to excessive torque) may occur. However, deceleration responsiveness delay may be solved by compensating for the rear-wheel torque command while the slope of the front-wheel torque command is limited.

However, since the rear-wheel torque command is limited to the minimum rear-wheel torque threshold value including a positive (+) value, if a value obtained by subtracting the front-wheel torque command, the slope of which is limited, from the total torque command becomes equal to or less than the minimum rear-wheel torque threshold value, the rear-wheel torque command is not decreased any more.

In the instant case, since it is impossible to compensate for the rear-wheel torque command to solve the deceleration responsiveness delay, braking hydraulic pressure is generated to generate friction braking torque by an amount necessary for compensation. Through this, it is possible to solve the deceleration responsiveness delay problem.

That is, while the slope (change rate) of the front-wheel torque command is limited, the rear-wheel torque command is compensated by adding torque equivalent to the limited amount thereto. However, in a state in which the rear-wheel torque command is limited to the minimum rear-wheel torque threshold value, if a sum of the front-wheel torque command, the slope of which is limited, and the rear-wheel torque command (minimum rear-wheel torque threshold value) does not satisfy the total torque command, insufficient deceleration torque is compensated for by generating friction braking torque.

During the deceleration torque compensation, a torque value obtained by summing the front-wheel torque command, the slope of which is limited, the rear-wheel torque command determined to be the minimum rear-wheel torque threshold value, and the friction braking torque command follows the total torque command. At the instant time, the friction braking torque command is determined to be a value obtained by subtracting the front-wheel torque command, the slope of which is limited, and the minimum rear-wheel torque threshold value from the total torque command.

As a result, the controller 20 is configured to control operation of the front-wheel motor 31 and the rear-wheel motor 41 in response to the front-wheel torque command and the rear-wheel torque command, generates braking hydraulic pressure in response to the friction braking torque command, and is configured to control operation of the friction braking device 50, generating torque necessary for the vehicle.

Referring to FIG. 7, it may be seen that, after the time point (C), the rear-wheel torque command is determined to be the minimum rear-wheel torque threshold value, and the torque slope is limited while the front-wheel torque command passes through the backlash band.

Furthermore, to compensate for the insufficient deceleration torque during the torque slope control, braking hydraulic pressure is generated to generate friction braking torque. Subsequently, after the front-wheel torque command passes through the backlash band, the braking hydraulic pressure and the friction braking torque are decreased so that a sum of the front-wheel torque command and the rear-wheel torque command satisfies the total torque command.

When the accelerator pedal is released after the front-wheel torque command passes through the backlash band, the torque control mode of the vehicle is switched back to mode 2, which is the contra-directional distribution mode in the regenerative direction thereof. In mode 2, the rear-wheel torque command is maintained at and limited to the minimum rear-wheel torque threshold value, which is a positive (+) value, and at the same time, the front-wheel torque command is compensated by adding torque equivalent to the limited amount of torque according to the rear-wheel torque limiting thereto.

At the present time, the front-wheel torque command is determined to be a value obtained by subtracting the rear-wheel torque command from the total torque command, so that a sum of the front-wheel torque command and the rear-wheel torque command is always the value of the total torque command.

Referring to the vehicle acceleration graph illustrated in the lower end portion of FIG. 7, it may be seen that vehicle acceleration delay or vehicle deceleration delay does not occur at the time points (B) and (C) although the front-wheel torque command passes through the backlash band while undergoing zero-crossing.

At the time point (D), the driver applies the brake pedal, and accordingly, the required torque is changed to deceleration torque, which is negative (−) torque. According to the above-described mode switching method, the torque control mode of the vehicle is switched from mode 2, which is the contra-directional distribution mode in the regenerative direction, to mode 4, which is the co-directional distribution mode in the regenerative direction thereof.

At the present time, since the torque control mode is switched from the contra-directional distribution mode to the co-directional distribution mode for regeneration, the rear-wheel torque command maintained at a positive (+) value needs to be decreased to a negative (−) value after passing through the backlash band while undergoing zero-crossing.

In the present way, while the rear-wheel torque command passes through the backlash band, backlash control is performed by the controller 20 to limit the slope (change rate) of the rear-wheel torque command, similar to limit of the slope of the front-wheel torque command. During the backlash control, the slope of the rear-wheel torque command is controlled to a maximum allowable change rate set to a small value that does not cause backlash impact.

Furthermore, as the rear-wheel torque command passes through the backlash band while undergoing zero-crossing, a vehicle deceleration responsiveness delay (excessive torque) phenomenon may occur. To compensate for the deceleration responsiveness delay, the front-wheel torque command is decreased. Here, decreasing the front-wheel torque command means changing the front-wheel torque command so that the absolute value of the front-wheel torque command including a negative (−) value increases.

To compensate for the deceleration responsiveness delay as described above, the controller 20 may cause a sum of the front-wheel torque command and the rear-wheel torque command to follow the total torque command while limiting the slope of the rear-wheel torque command, and may be configured to determine a value obtained by subtracting the rear-wheel torque command, the slope of which is limited, from the total torque command to be the front-wheel torque command.

However, when a margin to the lower limit of the torque of the front-wheel torque command is not sufficient and thus the torque of the front-wheel motor 31 does not completely satisfy the amount of compensation required to generate the total torque command, the controller 20 is configured to perform control so that friction braking torque satisfies the remaining amount of compensation.

That is, when a value obtained by subtracting the rear-wheel torque command (which is a negative value) from the total torque command is smaller than the preset lower limit value of the torque of the front-wheel motor 31 (which is a negative value), to compensate for the insufficient torque in the total torque command during slope control of the rear-wheel torque command, the lower limit value of the torque which may be output by the front-wheel motor 31 is satisfied by the front-wheel torque, and the remaining amount of torque is satisfied by the friction braking torque obtained by generating braking hydraulic pressure.

To the present end, the controller may compare a value obtained by subtracting the rear-wheel torque command from the total torque command with the lower limit value of the torque of the front-wheel motor 31, and may be configured to determine a maximum value among the two values to be the front-wheel torque command.

Since the above two values are negative (−) values, a value including a smaller absolute value among the value obtained by subtracting the rear-wheel torque command from the total torque command and the lower limit value of the torque of the front-wheel motor 31 is determined to be the front-wheel torque command.

If the front-wheel torque command is determined by the controller 20 to be the lower limit value of the torque that the front-wheel motor 31 may output, the friction braking torque command may be determined to be a torque value obtained by subtracting the rear-wheel torque command, the slope of which is limited, and the front-wheel torque command (lower limit value of torque) from the total torque command.

When the friction braking torque command is determined in the present way, the controller 20 is configured to control operation of the front-wheel motor 31 in response to the front-wheel torque command, and is configured to control operation of the rear-wheel motor 41 in response to the rear-wheel torque command. At the same time, the controller 20 is configured to control operation of the friction braking device 50 to generate required braking hydraulic pressure and friction braking torque in response to the determined friction braking torque command. Accordingly, complete torque compensation capable of satisfying the required total torque command may be implemented.

Thereafter, while the co-directional distribution in the regenerative direction is performed after the rear-wheel torque command completely passes through the backlash band, the front-wheel torque command and the rear-wheel torque command are determined through a general front/rear wheel torque distribution process of distributing the total torque command according to a front/rear wheel distribution ratio, and a sum of the front-wheel torque command and the rear-wheel torque command is made to follow the total torque command.

If the sum of the front-wheel torque command and the rear-wheel torque command does not satisfy the total torque command due to the lower limit of the torque of the front-wheel motor 31 or the rear-wheel motor 41, the remaining braking torque necessary for the satisfaction is satisfied by generating friction braking torque. In the instant case, a sum of the rear-wheel torque command (regenerative torque command), the front-wheel torque command (regenerative torque command), and the friction braking torque command is made to follow the total torque command.

At the time point (E), the driver releases the brake pedal. Accordingly, according to the above-described mode switching method, the torque control mode is switched from mode 4, which is co-directional distribution mode in the regenerative direction, to mode 2, which is contra-directional distribution mode in the regenerative direction thereof.

At the present time, the rear-wheel torque command maintained at negative (−) torque is increased back to the minimum rear-wheel torque threshold value, which is a positive (+) torque value. To the present end, the rear-wheel torque command needs to pass through the backlash band while undergoing zero-crossing.

While the rear-wheel torque command passes through the backlash band after the time point (E), the controller 20 is configured to perform backlash control to limit the slope of the rear-wheel torque command. During the backlash control, the slope of the rear-wheel torque command is controlled to a maximum allowable change rate set to a small value that does not cause backlash impact.

Furthermore, as the rear-wheel torque command passes through the backlash band while undergoing zero-crossing, a vehicle deceleration responsiveness delay (excessive torque) phenomenon may occur. To compensate for the deceleration responsiveness delay, the front-wheel torque command is increased. Here, increasing the front-wheel torque command means changing the front-wheel torque command so that the absolute value of the front-wheel torque command including a negative (−) value decreases.

Examples of mode switching and torque control states at the time points (D) and (E) have been described above with reference to FIG. 7. Referring to the vehicle acceleration graph illustrated in the lower end portion of FIG. 7, it may be seen that vehicle responsiveness delay does not occur at the time points (D) and (E) although the rear-wheel torque command passes through the backlash band while undergoing zero-crossing.

As is apparent from the above description, according to the torque control method for a drive system of an electric vehicle of the present disclosure, a motor is used only in a torque region irrelevant to backlash in a contra-directional distribution mode, whereby occurrence of backlash may be prevented.

According to an exemplary embodiment of the present disclosure, backlash vibration, noise, and impact problems may be effectively solved, motor control specialized for a high-performance driving mode may be performed, and turning performance of the vehicle may be improved. Furthermore, because torque generation is possible without a concern about backlash problems, longitudinal responsiveness of the vehicle may be greatly improved.

According to an exemplary embodiment of the present disclosure, a driving mode emphasizing direct connection for high-performance electric vehicles may be provided, convenience and accuracy of load movement control when turning on a track may be improved, and ease of use of a special driving mode such as a drift mode may be improved.

In an exemplary embodiment of the present disclosure, an optimal method for automatic switching between distribution modes may be provided, and therefore, problems of responsiveness limit of a co-directional distribution mode and output limit of a contra-directional distribution mode may be solved together.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B".

Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling torque of a drive system of a vehicle, the method comprising:
   determining, by a controller, a total torque command required for driving of the vehicle;
   determining, by the controller, a torque control mode corresponding to a current driving state of the vehicle among a plurality of preset torque control modes and entering the determined torque control mode;
   determining, by the controller, a front-wheel torque command and a rear-wheel torque command according to the entered torque control mode from the determined total torque command; and
   controlling, by the controller, a front-wheel motor and a rear-wheel motor of the vehicle in response to the determined front-wheel torque command and the determined rear-wheel torque command,
   wherein the plurality of torque control modes includes:
      a contra-directional distribution mode in an acceleration direction in which the front-wheel torque command is determined to be a maximum front-wheel torque threshold value set as a negative (−) torque value in a regenerative direction and the rear-wheel torque command is determined to be a positive (+) torque value in a driving direction; and
      a contra-directional distribution mode in a regenerative direction in which the rear-wheel torque command is determined to be a minimum rear-wheel torque threshold value set as a positive (+) torque value in the driving direction and the front-wheel torque command is determined to be a negative (−) torque value in the regenerative direction.

2. The method of claim 1,
   wherein, in the contra-directional distribution mode in the acceleration direction, the rear-wheel torque command is determined to be a value obtained by subtracting the maximum front-wheel torque threshold value from the total torque command, and
   wherein, in the contra-directional distribution mode in the regenerative direction, the front-wheel torque command is determined to be a value obtained by subtracting the minimum rear-wheel torque threshold value from the total torque command.

3. The method of claim 1,
   wherein the maximum front-wheel torque threshold value is set to a value smaller than a lower limit threshold value of a backlash band set as a torque region including a possibility of occurrence of backlash in a front-wheel-side drive system, and
   wherein the minimum rear-wheel torque threshold value is set to a value greater than an upper limit threshold value of a backlash band set as a torque region including a possibility of occurrence of backlash in a rear-wheel-side drive system.

4. The method of claim 1, wherein, in the determining of the torque control mode and the entering of the determined torque control mode,
   in response that the current driving state of the vehicle is an off state in which an accelerator pedal and a brake pedal are released, the contra-directional distribution mode in the regenerative direction is determined, and
   in response that the current driving state of the vehicle is an accelerator pedal on state in which the accelerator pedal is applied and in response that the total torque command is equal to or less than a predetermined mode switching threshold value, the contra-directional distribution mode in the acceleration direction is determined.

5. The method of claim 4, wherein, in the determining of the torque control mode and the entering of the determined torque control mode,
   in response that the accelerator pedal on state is entered and the total torque command becomes equal to or less than the mode switching threshold value during the contra-directional distribution mode in the regenerative direction, the contra-directional distribution mode in the acceleration direction is entered.

6. The method of claim 4, wherein, in the determining of the torque control mode and the entering of the determined torque control mode,
   in response that the accelerator pedal and the brake pedal are turned off during the contra-directional distribution mode in the acceleration direction, the contra-directional distribution mode in the regenerative direction is entered.

7. The method of claim 1, wherein the plurality of torque control modes further includes a co-directional distribution mode in an acceleration direction in which the front-wheel torque command and the rear-wheel torque command are determined to be positive (+) torque values.

8. The method of claim 7, wherein, in the determining of the torque control mode and the entering of the determined torque control mode,
   in response that the current driving state of the vehicle is an accelerator pedal on state in which an accelerator pedal is applied and in response that the total torque command exceeds a predetermined mode switching threshold value, the co-directional distribution mode in the acceleration direction is determined.

9. The method of claim 8, wherein, in the determining of the torque control mode and the entering of the determined torque control mode,
   in response that the accelerator pedal on state is entered and the total torque command exceeds the mode switching threshold value during the contra-directional distribution mode in the acceleration direction, the co-directional distribution mode in the acceleration direction is entered.

10. The method of claim 9, wherein, in response that the torque control mode is switched from the contra-directional distribution mode in the acceleration direction to the co-directional distribution mode in the acceleration direction, while the front-wheel torque command is changed to pass through a backlash band set as a torque region including 0 torque, the controller is further configured to perform slope limiting to limit a slope of the front-wheel torque command to a predetermined maximum allowable change rate, and to determine a value obtained by subtracting the front-wheel torque command including the limited slope from the total torque command to be the rear-wheel torque command.

11. The method of claim 9, wherein, in response that the torque control mode is switched from the co-directional distribution mode in the acceleration direction to the contra-directional distribution mode in the acceleration direction, while the front-wheel torque command is changed to pass through a backlash band set as a torque region including 0 torque, the controller is further configured to perform slope limiting to limit a slope of the front-wheel torque command to a predetermined maximum allowable change rate, and to determine a value obtained by subtracting the front-wheel torque command including the limited slope from the total torque command to be the rear-wheel torque command.

12. The method of claim 9, wherein, in response that the torque control mode is switched from the co-directional distribution mode in the acceleration direction to the contra-directional distribution mode in the acceleration direction, while the front-wheel torque command is changed to pass through a backlash band set as a torque region including 0 torque, the controller is further configured to perform slope limiting to limit a slope of the front-wheel torque command to a predetermined maximum allowable change rate, and wherein, in response that a value obtained by subtracting the front-wheel torque command including the limited slope from the total torque command is equal to or less than the minimum rear-wheel torque threshold value, the controller is further configured to determine the minimum rear-wheel torque threshold value to be the rear-wheel torque command, and to generate a friction braking torque command corresponding to a value obtained by subtracting the front-wheel torque command including the limited slope and the minimum rear-wheel torque threshold value from the total torque command and to generate friction braking torque using a friction braking device.

13. The method of claim 1, wherein the plurality of torque control modes further includes a co-directional distribution mode in a regenerative direction in which the front-wheel torque command and the rear-wheel torque command are determined to be negative (−) torque values.

14. The method of claim 13, wherein, in the determining of the torque control mode and the entering of the determined torque control mode, in response that the current driving state of the vehicle is a brake pedal on state in which a brake pedal is applied, the co-directional distribution mode in the regenerative direction is determined.

15. The method of claim 14, wherein, in the determining of the torque control mode and the entering of the determined torque control mode, in response that the brake pedal on state is entered during the contra-directional distribution mode in the regenerative direction, the co-directional distribution mode in the regenerative direction is entered.

16. The method of claim 15, wherein, in response that the torque control mode is switched from the contra-directional distribution mode in the regenerative direction to the co-directional distribution mode in the regenerative direction, while the rear-wheel torque command is changed to pass through a backlash band set as a torque region including 0 torque, the controller is further configured to perform slope limiting to limit a slope of the rear-wheel torque command to a predetermined maximum allowable change rate, and to determine a maximum value among a value obtained by subtracting the rear-wheel torque command including the limited slope from the total torque command and a lower limit value of torque of the front-wheel motor to be the front-wheel torque command.

17. The method of claim 16, wherein, in response that the torque control mode is switched from the contra-directional distribution mode in the regenerative direction to the co-directional distribution mode in the regenerative direction, while the rear-wheel torque command is changed to pass through the backlash band, the controller is further configured to generate a friction braking torque command corresponding to a value obtained by subtracting the rear-wheel torque command including the limited slope and the front-wheel torque command from the total torque command and to generate friction braking torque using a friction braking device upon determining the lower limit value of torque of the front-wheel motor to be the front-wheel torque command.

18. The method of claim 15, wherein, in response that the torque control mode is switched from the co-directional distribution mode in the regenerative direction to the contra-directional distribution mode in the regenerative direction, while the rear-wheel torque command is changed to pass through a backlash band set as a torque region including 0 torque, the controller is further configured to perform slope limiting to limit a slope of the rear-wheel torque command to a predetermined maximum allowable change rate, and to determine a value obtained by subtracting the rear-wheel torque command including the limited slope from the total torque command to be the front-wheel torque command.

19. The method of claim 14, wherein, in the determining of the front-wheel torque command and the rear-wheel torque command, the front-wheel torque command and the rear-wheel torque command are determined to generate regenerative braking torque through a front/rear wheel torque distribution process of distributing the total torque command according to a front/rear wheel distribution ratio during the co-directional distribution mode in the regenerative direction thereof.

20. The method of claim 19, wherein, in response that a sum of the front-wheel torque command and the rear-wheel torque command does not satisfy the total torque command due to a lower limit of torque of the front-wheel motor or the rear-wheel motor during the co-directional distribution mode in the regenerative direction, the controller is further configured to generate friction braking torque using a friction braking device so that a sum of the regenerative braking torque generated by the front-wheel torque command and the rear-wheel torque command and the generated friction braking torque satisfies braking torque of the total torque command.

* * * * *